(12) United States Patent
Yonemura

(10) Patent No.: US 10,409,067 B2
(45) Date of Patent: Sep. 10, 2019

(54) COMPONENT FOR HEAD MOUNTED DISPLAY

(71) Applicant: ASAHI KASEI KABUSHIKI KAISHA, Chiyoda-ku, Tokyo (JP)

(72) Inventor: Masami Yonemura, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 0 days.

(21) Appl. No.: 15/923,194

(22) Filed: Mar. 16, 2018

(65) Prior Publication Data

US 2018/0267315 A1 Sep. 20, 2018

(30) Foreign Application Priority Data

Mar. 17, 2017 (JP) ................. 2017-053690

(51) Int. Cl.
| | |
|---|---|
| *G02B 27/01* | (2006.01) |
| *G02B 27/09* | (2006.01) |
| *G02B 27/28* | (2006.01) |
| *C08F 297/00* | (2006.01) |
| *G02B 1/04* | (2006.01) |

(52) U.S. Cl.
CPC ........ *G02B 27/0172* (2013.01); *C08F 297/00* (2013.01); *G02B 1/041* (2013.01); *G02B 27/0176* (2013.01); *G02B 27/0955* (2013.01); *G02B 27/0977* (2013.01); *G02B 27/283* (2013.01)

(58) Field of Classification Search
CPC ...... C08L 33/12; C08L 33/08; C08L 2203/16; C08L 2205/03; C08L 2205/02; C08J 5/18; C08J 2333/12; C08J 2333/08; C08J 2433/08; C08J 2433/12; G02B 1/04; G02B 27/0172; G02B 1/041; G02B 27/283; G02B 27/0176; G02B 27/0977; G02B 27/0955
See application file for complete search history.

(56) References Cited

U.S. PATENT DOCUMENTS

| | | | |
|---|---|---|---|
| 9,195,067 B1 | 11/2015 | Heinrich et al. | |
| 2006/0152782 A1 | 7/2006 | Noda et al. | |
| 2008/0266493 A1* | 10/2008 | Yonezawa | C08L 25/10 349/96 |
| 2013/0072651 A1 | 3/2013 | Yonemura et al. | |
| 2014/0128547 A1 | 5/2014 | Yonemura et al. | |
| 2015/0348327 A1 | 12/2015 | Zalewski | |
| 2016/0053104 A1* | 2/2016 | Kitayama | G02B 1/04 524/504 |

FOREIGN PATENT DOCUMENTS

| | | |
|---|---|---|
| JP | 2006162798 A | 6/2006 |
| JP | 2013016312 A | 1/2013 |
| JP | 2013109285 A | 6/2013 |
| JP | 2014111749 A | 6/2014 |
| JP | 2015101707 A | 6/2015 |
| JP | 2015227458 A | 12/2015 |
| WO | 2011149088 A1 | 12/2011 |
| WO | 2013005634 A1 | 1/2013 |
| WO | 2016185722 A1 | 11/2016 |

* cited by examiner

*Primary Examiner* — Sultan Chowdhury
*Assistant Examiner* — Danell L Owens
(74) *Attorney, Agent, or Firm* — Kenja IP Law PC

(57) ABSTRACT

Provided is a component for head mounted display comprising a thermoplastic resin composition having a glass-transition temperature (Tg) of 120° C. or higher, having an absolute value of in-plane phase difference of 30 nm or less in terms of 3 mm thickness.

13 Claims, 2 Drawing Sheets

COMPONENT FOR HEAD MOUNTED DISPLAY

TECHNICAL FIELD

This disclosure relates to a component for head mounted display. Specifically, this disclosure relates to an optical lens, a molded product, a laminate, a half mirror, a polarization beam splitter, etc.

BACKGROUND

Recently, various electronic techniques known as VR (Virtual Reality) and AR (Augmented Reality) have been developing rapidly, and as image display devices thereof, head mount display (HMD) products are becoming widespread.

HMD include different types of spectacle type (PTL 1: U.S. Pat. No. 9,195,067 B1) and goggle type (PTL 2: US 2015/0348327 A1), both of which are head-mounted image display devices and are thus requested to have lower weight and to cause less uncomfortable feeling.

Specifically, HMD are constituted by: a casing; a liquid-crystal display (LCD) or an organic EL display (OLED) as an image display unit, and optionally: a component for HMD represented by a half mirror, a polarization beam splitter, etc. Therefore, for the purpose of weight reduction, it is desired to use resin instead of glass used in the component HMD.

CITATION LIST

Patent Literature

PTL 1: U.S. Pat. No. 9,195,067 B1
PTL 2: US 2015/0348327 A1

SUMMARY

Technical Problem

However, a component for HMD using an existing resin (e.g. PMMA, PC) as a material cannot satisfy high optical isotropy (low birefringence), heat resistance, color tone, surface hardness, durability in environment of use, etc. required when used for HMD. Currently, there does not exist a resin component for HMD capable of substituting glass.

It thus would be helpful to provide a resin component for HMD having high optical isotropy (low birefringence) necessary as a component for HMD, and having excellent heat resistance, color tone, surface hardness, durability in environment of use, and inorganic adhesion.

Solution to Problem

As a result of intensive study for solving the aforementioned problem, the inventors discovered that by using a specific acryl based thermoplastic resin, it is possible to obtain a resin component for HMD having high optical isotropy (low birefringence), and having excellent heat resistance, color tone, surface hardness, durability in environment of use, and inorganic adhesion. The disclosed products were completed based on the discoveries set forth above.

The primary features of this disclosure are as follows.
[1] A component for head mounted display comprising a thermoplastic resin composition having a glass-transition temperature (Tg) of 120° C. or higher, having an in-plane phase difference in absolute value of 30 nm or less in terms of 3 mm thickness.
[2] The component for head mounted display according to [1], wherein: the thermoplastic resin composition is a thermoplastic resin composition having a photoelastic coefficient in absolute value of $3.0 \times 10^{-12}$ $Pa^{-1}$ or less.
[3] The component for head mounted display according to [1] or [2], wherein: the thermoplastic resin composition includes a methacrylic resin having a cyclic structure-containing main chain.
[4] The component for head mounted display according to [3], wherein: when the methacrylic resin composition is subjected to GC/MS measurement, components detected at a retention time of 22 minutes to 32 minutes have a total content 0.01 mass % to 0.40 mass % when the methacrylic resin is taken to be 100 mass %.
[5] The component for head mounted display according to any one of [1] to [4], wherein: after holding for 500 hours under an atmosphere at 85° C., humidity 85%, variation of a color tone YI is less than 5 in terms of 3 mm thickness.
[6] An optical lens comprising the component for head mounted display according to any one of [1] to [5].
[7] A molded product comprising the component for head mounted display according to any one of [1] to [5].
[8] A laminate comprising at least one metal deposited layer on a surface of the molded product according to [7].
[9] A half mirror comprising the laminate according to [8].
[10] A polarization beam splitter comprising the laminate according to [8].

Advantageous Effect

According to this disclosure, it is possible to provide a resin component for HMD, specifically, to provide an optical lens, a molded product, a laminate, a half mirror, a polarization beam splitter, etc. having high optical isotropy (low birefringence) necessary as a component for HMD, and having excellent heat resistance, color tone, surface hardness, durability in environment of use, and inorganic adhesion. As a result, it is possible to provide an HMD with reduced weight.

DETAILED DESCRIPTION

Figure 1:
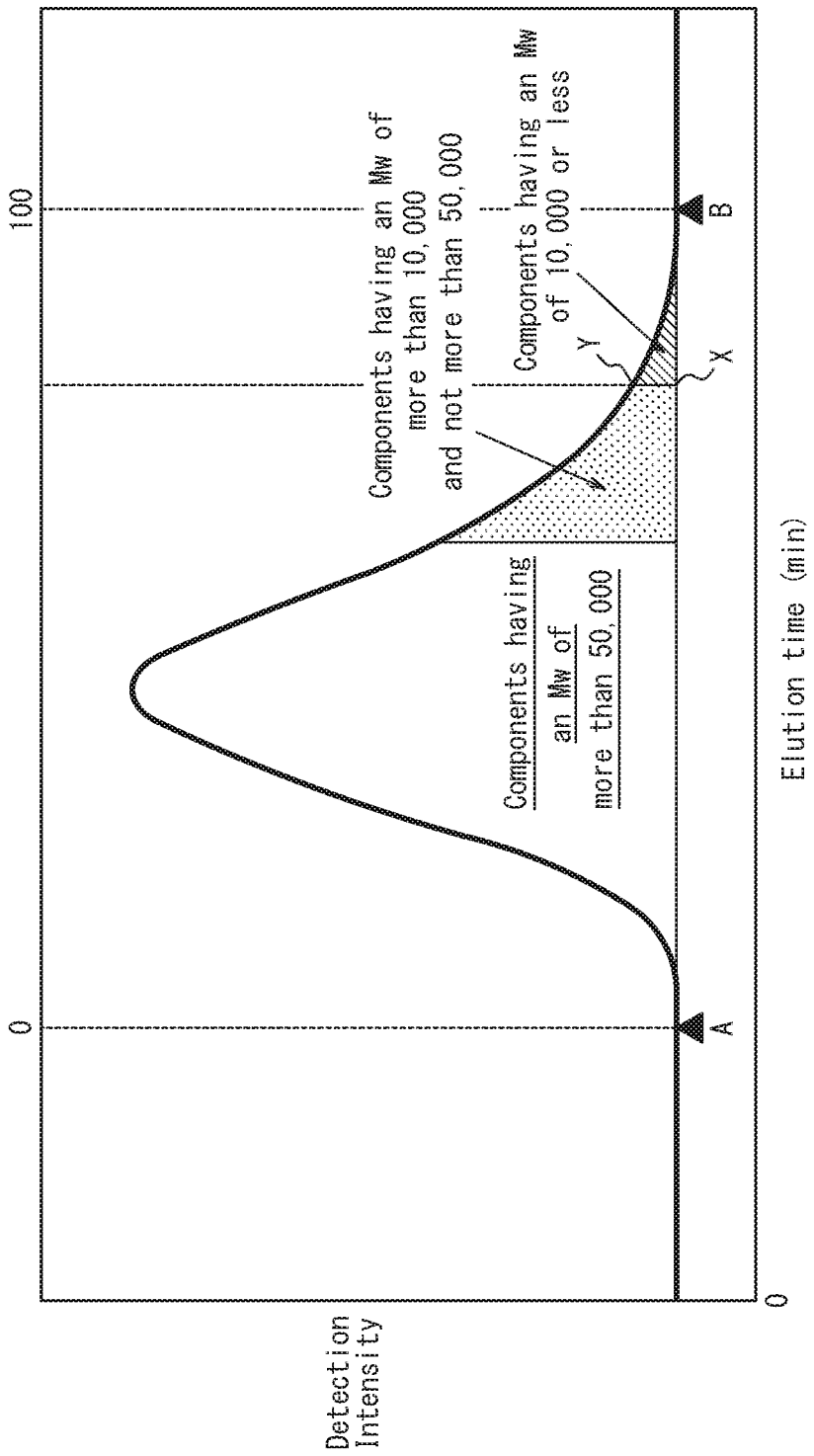
FIG. 1 schematically illustrates an elution curve when a methacrylic resin according to one embodiment of this disclosure is measured by gel permeation chromatography (GPC)

A preferable embodiment will be described in detail below.

This disclosure is not limited to the following description, but may be selected from a variation within the scope of the subject thereof.

In the following description, constitutional units of a polymer forming a methacrylic resin are referred to as " . . . monomer units" and/or " . . . structural units" including a plurality of such " . . . monomer units".

Moreover, a constituent material of a " . . . monomer unit" may be referred to simply as a " . . . monomer", by omitting the term "unit".

Moreover, in the embodiments of this disclosure, the expression "A (value) to B (value)" means A or more and B or less.

(Thermoplastic Resin)

It is preferable that the thermoplastic resin used in the present embodiment is a transparent thermoplastic resin for optical purpose. Specifically, a cyclic polyolefin based resin, a polycarbonate based resin, a methacrylic resin, etc. are preferable. From a viewpoint of heat resistance, a cyclic polyolefin based resin and a polycarbonate based resin are preferable, and from a viewpoint of low water absorbency, a cyclic polyolefin based resin is preferable.

Among these, from a viewpoint of optical properties (low birefringence), light resistance and weather resistance, a methacrylic resin is preferable. Further, from a viewpoint of high optical isotropy (low birefringence) and heat resistance, a methacrylic resin having a cyclic structure-containing main chain (hereinafter referred to as "the methacrylic resin according to the present embodiment" as well) is particularly preferable.

(Methacrylic Resin Having Cyclic Structure-Containing Main Chain)

The methacrylic resin according to the present embodiment is a methacrylic resin including 50 mass % to 97 mass % of a methacrylic acid ester monomer unit (A), 3 mass % to 30 mass % of a structural unit (B) having a cyclic structure-containing main chain, and 0 mass % to 20 mass % of another vinyl monomer unit (C) that is copolymerizable with a methacrylic acid ester monomer, and satisfying the following conditions (1) and (2).

(1) Weight average molecular weight as measured by gel permeation chromatography (GPC) is 65,000 to 300,000.

(2) when subjected to GC/MS measurement using a specific device and specific conditions described further below, components detected at a retention time of 22 minutes to 32 minutes have a total content of 0.01 mass % to 0.40 mass % when the methacrylic resin is taken to be 100 mass %.

The following provides a detailed description of monomer units and structural units that are included in the methacrylic resin.

(Methacrylic Acid Ester Monomer Unit (A))

A monomer unit indicated by the following general formula (1) can be suitably used as a methacrylic acid ester monomer unit (A) (hereinafter, also referred to as "monomer unit (A)") included in the methacrylic resin according to the present embodiment.

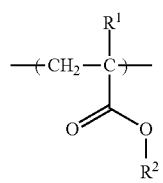

(1)

In general formula (1), $R^1$ represents a substituted or unsubstituted alkyl group having a carbon number of 1 to 6. The alkyl group may, for example, be substituted with a hydroxy group. $R^1$ is preferably a methyl group.

$R^2$ represents a group having a carbon number of 1 to 12, and preferably a hydrocarbon group having a carbon number of 1 to 12. The hydrocarbon group may, for example, be substituted with a hydroxy group. $R^2$ is preferably a group having a carbon number of 1 to 8.

Although no specific limitations are placed on the monomer used to form the monomer unit (A) indicated by general formula (1), it is preferable to use a methacrylic acid ester monomer indicated by the following general formula (2).

(2)

In general formula (2), $R^1$ represents a substituted or unsubstituted alkyl group having a carbon number of 1 to 6. The alkyl group may, for example, be substituted with a hydroxy group. $R^1$ is preferably a methyl group.

$R^2$ represents a group having a carbon number of 1 to 12, and preferably a hydrocarbon group having a carbon number of 1 to 12. The hydrocarbon group may, for example, be substituted with a hydroxy group. $R^2$ is preferably a group having a carbon number of 1 to 8. Note that $R^2$ may be either linear or branched.

Specific examples of such monomers include methyl methacrylate, ethyl methacrylate, n-propyl methacrylate, isopropyl methacrylate, n-butyl methacrylate, isobutyl methacrylate, t-butyl methacrylate, 2-ethylhexyl methacrylate; cyclopentyl methacrylate, cyclohexyl methacrylate, t-butylcyclohexyl methacrylate, cyclooctyl methacrylate, tricyclodecyl methacrylate, bicyclooctyl methacrylate, tricyclododecyl methacrylate, isobornyl methacrylate, phenyl methacrylate, benzyl methacrylate, 1-phenylethyl methacrylate, 2-phenoxyethyl methacrylate, 3-phenylpropyl methacrylate, 2,4,6-tribromophenyl methacrylate, 2,2,2-trifluoroethyl methacrylate, etc. One ester monomer may be used individually, or two or more ester monomers may be used together.

Of these methacrylic acid ester monomers, methyl methacrylate and benzyl methacrylate are preferable in terms of providing the resultant methacrylic resin with excellent transparency and weather resistance.

The monomer unit (A) of the methacrylic resin is included in the methacrylic resin in an amount of 50 mass % to 97 mass %, preferably 55 mass % to 97 mass %, even more preferably 55 mass % to 95 mass %, further preferably 60 mass % to 93 mass %, and even further preferably 60 mass % to 90 mass % from a viewpoint of imparting sufficient heat resistance on the methacrylic resin, the methacrylic resin composition, and the component for HMD according to the present embodiment through the subsequently described structural unit (B) having a cyclic structure-containing main chain.

(Structural Unit (B) Having a Cyclic Structure-Containing Main Chain)

The structural unit (B) having a cyclic structure-containing main chain included in the methacrylic resin according to the present embodiment is inclusive of at least one structural unit selected from the group consisting of a maleimide-based structural unit (B-1), a glutaric anhydride-based structural unit (B-2), a glutarimide-based structural unit (B-3), and a lactone ring structural unit (B-4).

One type of structural unit (B) having a cyclic structure-containing main chain may be used individually, or two or more types of structural units (B) having a cyclic structure-containing main chain may be used in combination.

[Maleimide-Based Structural Unit (B-1)]

A structural unit indicated by the following general formula (3) can be suitably used as a maleimide-based structural unit (B-1) included in the methacrylic resin according to the present embodiment.

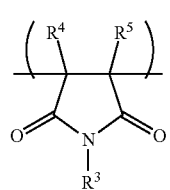

(3)

In general formula (3), $R^3$ represents one selected from the group consisting of a hydrogen atom, a cycloalkyl group having a carbon number of 3 to 12, an alkyl group having a carbon number of 1 to 12, an alkoxy group having a carbon number of 1 to 12, and an aryl group having a carbon number of 6 to 14. Note that the alkyl group, alkoxy group, or aryl group may have a substituent on a carbon atom thereof. In formula (3), $R^4$ and $R^5$ each represent, independently of one another, a hydrogen atom, an alkyl group having a carbon number of 1 to 12, or an aryl group having a carbon number of 6 to 14.

The cycloalkyl group having a carbon number of 3 to 12 in $R^3$ is preferably a cycloalkyl group having a carbon number of 5 to 12, more preferably a cycloalkyl group having a carbon number of 6 to 12. Examples of the cycloalkyl group having a carbon number of 3 to 12 in $R^3$ include a cyclopentyl group, a cyclohexyl group, a methylcyclohexyl group, an ethylcyclohexyl group, a propylcyclohexyl group, and a butylcyclohexyl group. Among these, from a viewpoint of ease of acquisition, a cyclohexyl group is preferable.

Examples of the aryl group having a carbon number of 6 to 14 in $R^3$ include a phenyl group, and a chlorophenyl group. Among these, from a viewpoint of easiness to obtain, a phenyl group is preferable.

The alkyl group having a carbon number of 1 to 12 in $R^4$ and $R^5$ is preferably an alkyl group having a carbon number of 1 to 6, more preferably an alkyl group having a carbon number of 1 to 4. Moreover, examples of the alkyl group having a carbon number of 1 to 12 in $R^4$ and $R^5$ include a methyl group, an ethyl group, an n-propyl group, an isopropyl group, an n-butyl group, an isobutyl group, a t-butyl group, a 2-ethyl hexyl group, a nonyl group, a decanyl group, and a lauryl group. Among these, from a viewpoint of further improving the transparency and the weather resistance of the acrylic thermoplastic resin, a methyl group, an ethyl group, an n-propyl group, an isopropyl group, an n-butyl group, an isobutyl group, a t-butyl group, and a 2-ethylhexyl group are preferable, and a methyl group is more preferable.

Examples of the aryl group having a carbon number of 6 to 14 in $R^4$ and $R^5$ include a phenyl group, a naphthyl group, and an anthracenyl group. Among these, from a viewpoint of further improving heat resistance and optical properties such as low birefringence and the like, a phenyl group is preferable.

$R^4$ and $R^5$ are preferably a hydrogen atom, an alkyl group having a carbon number of 1 to 4 or a phenyl group, more preferably a hydrogen atom.

Examples of monomers that can be used to form the maleimide-based structural unit (B-1) include, but are not specifically limited to, maleimide; an N-alkyl group substituted maleimide (B-1a) such as N-methyl maleimide, N-ethyl maleimide, N-n-propyl maleimide, N-isopropyl maleimide, N-n-butyl maleimide, N-isobutyl maleimide, N-s-butyl maleimide, N-t-butyl maleimide, N-n-pentyl maleimide, N-n-hexyl maleimide, N-n-heptyl maleimide, N-n-octyl maleimide, N-lauryl maleimide, N-stearyl maleimide, N-cyclopropyl maleimide, N-cyclobutyl maleimide, N-cyclopentyl maleimide, N-cyclohexyl maleimide, N-cycloheptyl maleimide, N-cyclooctyl maleimide, 1-cyclohexyl-3-methyl-1-phenyl-1H-pyrrole-2,5-dione, 1-cyclohexyl-3,4-dimethyl-1-phenyl-1H-pyrrole-2,5-dione, 1-cyclohexyl-3-phenyl-1H-pyrrole-2,5-dione, 1-cyclohexyl-3,4-diphenyl-1H-pyrrole-2,5-dione and the like; an N-aryl group substituted maleimide (B-1b) such as N-phenyl maleimide, N-benzyl maleimide, N-(2-chlorophenyl) maleimide, N-(4-chlorophenyl) maleimide, N-(4-bromophenyl) maleimide, N-(2-methylphenyl) maleimide, N-(2-ethylphenyl) maleimide, N-(2-methoxyphenyl) maleimide, N-(2-nitrophenyl) maleimide, N-(2,4,6-trimethylphenyl) maleimide, N-(4-benzylphenyl) maleimide, N-(2,4,6-tribromophenyl) maleimide, N-naphthyl maleimide, N-anthracenyl maleimide, N-butylphenyl maleimide, N-dimethylphenyl maleimide, N-hydroxyphenyl maleimide, N-(o-chlorophenyl) maleimide, N-(m-chlorophenyl) maleimide, N-(p-chlorophenyl) maleimide, 3-methyl-1-phenyl-1H-pyrrole-2,5-dione, 3,4-dimethyl-1-phenyl-1H-pyrrole-2,5-dione, 1,3-diphenyl-1H-pyrrole-2,5-dione, 1,3,4-triphenyl-1H-pyrrole-2,5-dione and the like.

Of these monomers, N-methylmaleimide, N-ethylmaleimide, N-isopropylmaleimide, and N-cyclohexylmaleimide are preferable as an N-alkyl substituted maleimide (B-1a) in terms of providing the methacrylic resin according to the present embodiment with excellent weather resistance, and N-cyclohexylmaleimide is particularly preferable in terms of providing excellent low water absorbency demanded of optical materials in recent years.

Moreover, as an N-aryl substituted maleimide (B-1b), N-phenyl maleimide, N-benzyl maleimide, N-methylphenyl maleimide, N-(o-chlorophenyl) maleimide, N-(m-chlorophenyl) maleimide, and N-(p-chlorophenyl) maleimide are preferable in terms of excellent optical properties such as heat resistance, low birefringence and the like. Further, N-methylphenyl maleimide, N-(o-chlorophenyl) maleimide, N-(m-chlorophenyl) maleimide, and N-(p-chlorophenyl) maleimide are preferable in terms of excellent transparency.

Among these monomers, from a viewpoint of ease of acquisition, N-cyclohexyl maleimide, N-phenyl maleimide, and N-benzyl maleimide are more preferable, and N-cyclohexyl maleimide and N-phenyl maleimide are even more preferable.

One type of the aforementioned maleimide-based structural unit (B-1) may be used individually, or two or more types of the aforementioned maleimide-based structural units (B-1) may be used in combination.

A content of the N-alkyl substituted maleimide (B-1a) is 0.1 mass % to 49.9 mass %, preferably 0.1 mass % to 35 mass %, more preferably 0.1 mass % to 30 mass % in terms of a total volume of the methacrylic resin. When the content of the N-alkyl substituted maleimide (B-1a) is set within any of the ranges set forth above, it is possible to maintain the transparency and exhibit the low water absorbency.

A content of the N-aryl substituted maleimide (B-1b) is 0.1 mass % to 49.9 mass %, preferably 0.1 mass % to 35 mass %, more preferably 0.1 mass % to 20 mass % in terms of a total volume of the methacrylic resin. When the content of the N-alkyl substituted maleimide is within any of the ranges set forth above, the methacrylic resin can display better heat resistance while maintaining transparency, and without yellowing or loss of environmental resistance.

In the methacrylic resin according to the present embodiment, although one type of the aforementioned maleimide-based structural unit (B-1) may be used individually, or two or more types of the aforementioned maleimide-based structural units (B-1) may be used in combination, from a viewpoint of optical properties (low birefringence; low photoelastic coefficient), it is particularly preferable to use an N-alkyl substituted maleimide (B-1a) and an N-aryl substituted maleimide (B-1b) in combination.

A total content of the monomer (B-1a) and the monomer (B-1b) is preferably 5 mass % to 50 mass %, more preferably 5 mass % to 40 mass %, even more preferably 10 mass % to 35 mass %, further preferably 10 mass % to 30 mass %, particularly preferably 15 mass % to 30 mass % in terms of the total amount of the methacrylic resin. When the total content of the monomer (B-1a) and the monomer (B-1b) is within any of the ranges set forth above, a more adequate enhancement effect can be achieved with respect to heat resistance of the methacrylic resin, and a more preferable enhancement effect can also be achieved with respect to weather resistance, low water absorbency, and optical properties of the methacrylic resin. Note that when the content of the monomers (B-1a) and (B-1b) exceeds 50 mass %, reactivity of monomer components during polymerization reaction is deteriorated, resulting in a larger monomer amount remaining unreacted and deterioration of physical properties of the methacrylic resin.

In the methacrylic resin according to the present embodiment, a molar ratio $C_{1b}/C_{1a}$ of a content $C_{1b}$ of (B-1b) relative to a content $C_{1a}$ of (B-1a) is preferably larger than 0 and 15 or less. From a viewpoint of the optical properties described below (low birefringence, low photoelastic coefficient), the ratio $C_{1b}/C_{1a}$ is more preferably 10 or less. When the molar ratio $C_{1b}/C_{1a}$ is within any of the ranges set forth above, the methacrylic resin of this disclosure exhibits better optical properties (low birefringence; low coefficient).

[Glutaric Anhydride-Based Structural Unit (B-2)]

A glutaric anhydride-based structural unit (B-2) included in the methacrylic resin according to the present embodiment may be formed after resin polymerization.

A structural unit indicated by the following general formula (4) can be suitably used as the structural unit (B-2).

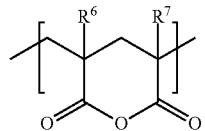

(4)

In general formula (4), $R^6$ and $R^7$ each represent, independently of one another, a hydrogen atom or a substituted or unsubstituted alkyl group having a carbon number of 1 to 6. The alkyl group may, for example, be substituted with a hydroxy group.

One type of glutaric anhydride-based structural unit (B-2) may be used individually, or two or more types of glutaric anhydride-based structural units (B-2) may be used in combination.

Although no specific limitations are placed on the method by which the glutaric anhydride-based structural unit (B-2) is formed, the structural unit (B-2) may be formed, for example, by copolymerizing a monomer having a structure represented by the following general formula (5) with a monomer used to form the methacrylic acid ester monomer unit (A), and subsequently carrying out cyclization through heat treatment in the presence or absence of a catalyst.

(5)

In general formula (5), $R^1$ represents a hydrogen atom or a substituted or unsubstituted alkyl group having a carbon number of 1 to 6. The alkyl group may, for example, be substituted with a hydroxy group.

$R^2$ represent a hydrogen atom or a t-butyl group.

Moreover, the monomer having the structure represented by general formula (5) may remain unreacted in the methacrylic resin to an extent that the effects disclosed herein can be exhibited.

A content of the glutaric anhydride-based structural unit (B-2) is not specifically limited, and may be appropriately determined regarding the heat resistance, the molding processability, the optical properties, etc.

The content of the glutaric anhydride-based structural unit (B-2) is preferably 1 mass % to 60 mass %, more preferably 3 mass % to 50 mass %, particularly preferably 3 mass % to 25 mass % when the methacrylic resin is taken to be 100 mass %.

[Glutarimide-Based Structural Unit (B-3)]

A glutarimide-based structural unit (B-3) included in the methacrylic resin according to the present embodiment may be formed after resin polymerization.

A structural unit indicated by the following general formula (6) can be suitably used as the structural unit (B-3).

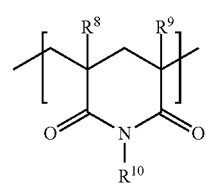

(6)

In general formula (6), $R^8$ and $R^9$ each represent, independently of one another, a hydrogen atom or a substituted or unsubstituted alkyl group having a carbon number of 1 to 6. The alkyl group may, for example, be substituted with a hydroxy group.

$R^{10}$ represents one selected from the group consisting of a hydrogen atom, a substituted or unsubstituted alkyl group having a carbon number of 1 to 6, and a substituted or unsubstituted aryl group having a carbon number of 6 to 18.

It is particularly suitable that $R^8$, $R^9$, and $R^{10}$ are each a methyl group. One type of glutarimide-based structural unit (B-3) may be used individually, or two or more types of glutarimide-based structural units (B-3) may be used in combination.

The content of the glutarimide-based structural unit (B-3) is not specifically limited and can be determined as appropriate in consideration of heat resistance, molding processability, optical properties, and so forth.

The content of the glutarimide-based structural unit (B-3) when the methacrylic resin is taken to be 100 mass % is preferably 1 mass % to 60 mass %, more preferably 3 mass % to 50 mass %, and particularly preferably 3 mass % to 25 mass %.

The content of the glutarimide-based structural unit (B-3) can be calculated, for example, by a method described in [0136] to [0137] of WO 2015/098096 A1.

The acid value of the resin including the glutarimide-based structural unit (B-3) is preferably 0.50 mmol/g or less, and more preferably 0.45 mmol/g or less when the balance of resin physical properties, molding processability, color tone, and so forth is taken into account.

The acid value can be calculated, for example, by a titration method described in JP 2005-23272 A.

The glutarimide-based structural unit (B-3) can be obtained by a commonly known method such as a method in which after copolymerization of a methacrylic acid ester and/or methacrylic acid, a urea or unsubstituted urea reaction is carried out with ammonia or an amine at high-temperature, a method in which ammonia or an amine is reacted with a methyl methacrylate-styrene copolymer, or a method in which ammonia or an amine is reacted with poly(methacrylic anhydride).

Specific examples include a method described by R. M. Kopchik in U.S. Pat. No. 4,246,374 A.

Moreover, the glutarimide-based structural unit (B-3) can be formed through imidization of an acid anhydride such as maleic anhydride, a half ester of the acid anhydride and a linear or branched alcohol having a carbon number of 1 to 20, or an α,β-ethylenically unsaturated carboxylic acid.

Examples of other preferable production methods that can be used include a method in which a (meth)acrylic acid ester is polymerized with an aromatic vinyl monomer or another vinyl monomer as necessary, and then an imidization reaction is carried out to obtain a resin including the glutarimide-based structural unit (B-3).

The imidization reaction process may be carried out using an imidization agent, and a ring-closing promoter (a.k.a. a catalyst) may be added as necessary. Ammonia or a primary amine can be used as the imidization agent. Examples of primary amines that can be suitably used include methylamine, ethylamine, n-propylamine, and cyclohexylamine.

The method by which the imidization reaction is implemented is not specifically limited and may be a conventional and commonly known method. For example, a method using an extruder, a horizontal twin screw reactor, or a batch reaction tank may be adopted. The extruder is not specifically limited and suitable examples thereof include single screw extruders, twin screw extruders, and multiscrew extruders. More suitably, a tandem reaction extruder in which two twin screw extruders are arranged in series may be used.

In production of the resin, an esterification process of treatment with an esterification agent may be included in addition to the imidization reaction process. Through inclusion of the esterification process, carboxyl groups included in the resin as a by-product of the imidization process can be converted to ester groups, and the acid value of the resin can be adjusted to within a desired range. The esterification agent is not specifically limited so long as the effects disclosed herein can be exhibited, and suitable examples include dimethyl carbonate and trimethylacetate. Although the amount of esterification agent that is used in not specifically limited, it is preferable to use 0 parts by mass to 12 parts by mass per 100 parts by mass of the resin.

Furthermore, an aliphatic tertiary amine such as trimethylamine, triethylamine, or tributylamine may be used as a catalyst in combination with the esterification agent.

[Lactone Ring Structural Unit (B-4)]

A lactone ring structural unit (B-4) included in the methacrylic resin according to the present embodiment may be formed after resin polymerization.

A structural unit indicated by the following general formula (7) can be suitably used as the structural unit (B-4).

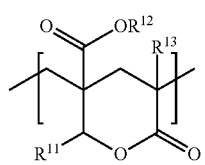

(7)

In general formula (7), $R^{11}$, $R^{12}$, and $R^{13}$ each represent, independently of one another, a hydrogen atom or an organic group having a carbon number of 1 to 20. The organic group may include an oxygen atom.

One type of lactone ring structural unit (B-4) may be used individually, or two or more types of lactone ring structural units (B-4) may be used in combination.

Although no specific limitations are placed on the method by which the polymer including the lactone ring structural unit (B-4) is formed, production may be carried out by a method in which a monomer having a hydroxy group-containing side chain, such as a monomer having a structure represented by the following general formula (8) (for example, methyl 2-(hydroxymethyl)acrylate), is copolymerized with a monomer having an ester group, such as the aforementioned methacrylic acid ester monomer (A), and the resultant copolymer is subsequently subjected to heat treatment in the presence or absence of a specific ring-closing promoter (a.k.a. a catalyst) to introduce a lactone cyclic structure into the polymer.

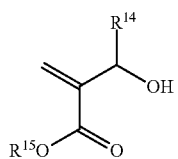

(8)

In general formula (8), $R^{14}$ represents a hydrogen atom or a substituted or unsubstituted alkyl group having a carbon number of 1 to 6. The alkyl group may, for example, be substituted with a hydroxy group.

$R^{15}$ represents a group having a carbon number of 1 to 12, and preferably a hydrocarbon group having a carbon number of 1 to 12. The hydrocarbon group may, for example, be substituted with a hydroxy group.

It is particularly suitable that $R^{14}$ is a hydrogen atom and $R^{15}$ is a methyl group.

Moreover, the monomer having the structure represented by general formula (8) may remain unreacted in the methacrylic resin to an extent that the effects disclosed herein can be exhibited.

From a viewpoint of thermal stability and molding processability, it is preferable that the methacrylic resin set forth above, which may be (B-1) to (B-4) as described above, includes at least one type of structural unit selected from the group consisting of a maleimide-based structural unit (B-1) and a glutarimide-based structural unit (B-3) as the structural unit (B), and more preferable that the methacrylic resin includes a maleimide-based structural unit (B-1) as the structural unit (B).

The structural unit (B) having a cyclic structure-containing main chain is included in the methacrylic resin in an amount of 3 mass % to 30 mass % from a viewpoint of heat resistance, thermal stability, strength, and fluidity of the methacrylic resin composition according to the present embodiment. From a viewpoint of imparting heat resistance and thermal stability on the methacrylic resin composition according to the present embodiment, the content of the structural unit (B) having a cyclic structure-containing main chain in the methacrylic resin is preferably 5 mass % or more, more preferably 7 mass % or more, even more preferably 8 mass % or more. Moreover, from a viewpoint of maintaining a good balance of mechanical strength required for a molded product and fluidity, the content of the structural unit (B) having a cyclic structure-containing main chain in the methacrylic resin is preferably 28 mass % or less, more preferably 25 mass % or less, even more preferably 20 mass % or less, further preferably 18 mass % or less, and even further preferably less than 15 mass %.

Inclusion of the structural unit (B) having a cyclic structure-containing main chain in the methacrylic resin can inhibit thermal decomposition when the methacrylic resin is placed in a high-temperature environment, and can reduce the amount of volatile components that are generated. As a result, improvement of thermal stability of the methacrylic resin according to the present embodiment is certified.

(Other Vinyl Monomer Unit (C) Copolymerizable with Methacrylic Acid Ester Monomer)

Examples of the other vinyl monomer unit (C) copolymerizable with a methacrylic acid ester monomer (hereinafter, also referred to as "monomer unit (C)") that is included in the methacrylic resin according to the present embodiment include an aromatic vinyl monomer unit (C-1), an acrylic acid ester monomer unit (C-2), a vinyl cyanide monomer unit (C-3), and other monomer units (C-4).

One type of other vinyl monomer unit (C) that is copolymerizable with a methacrylic acid ester monomer may be used individually, or two or more types of other vinyl monomer units (C) that are copolymerizable with a methacrylic acid ester monomer may be used in combination.

An appropriate material for the monomer unit (C) can be selected depending on the properties required of the methacrylic resin according to the present embodiment, but in a case in which properties such as thermal stability, fluidity, mechanical properties, and chemical resistance are particularly necessary, one or more selected from the group consisting of an aromatic vinyl monomer unit (C-1), an acrylic acid ester monomer unit (C-2), and a vinyl cyanide monomer unit (C-3) can be suitably used.

[Aromatic Vinyl Monomer Unit (C-1)]

Although no specific limitations are placed on monomers that can be used to form an aromatic vinyl monomer unit (C-1) included in the methacrylic resin according to the present embodiment, an aromatic vinyl monomer represented by the following general formula (9) is preferable.

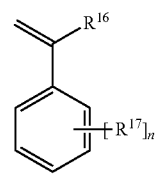

(9)

In general formula (9), $R^{16}$ represents a hydrogen atom or an alkyl group having a carbon number of 1 to 6. The alkyl group may, for example, be substituted with a hydroxy group.

$R^{17}$ is one selected from the group consisting of a hydrogen atom, an alkyl group having a carbon number of 1 to 12, an alkoxy group having a carbon number of 1 to 12, an aryl group having a carbon number of 6 to 8, and an aryloxy group having a carbon number of 6 to 8. Note that each $R^{17}$ may be the same group or a different group. Moreover, a cyclic structure may be formed by $R^{17}$ groups. Moreover, n represents an integer of 0 to 5.

Specific examples of monomers represented by general formula (9) include, but are not specifically limited to, styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, 1-vinylnaphthalene, 2-vinylnaphthalene, 1,1-diphenylethylene, α-methylstyrene, isopropenyltoluene, isopropenylethylbenzene, isopropenylpropylbenzene, isopropenylbutylbenzene, isopropenylpentylbenzene, isopropenylhexylbenzene, and isopropenyloctylbenzene.

Of these examples, styrene and α-methylstyrene are preferable from a viewpoint of excellent copolymerizability and capability of adjustment of optical properties when used at a small amount. Styrene is more preferable from a viewpoint of imparting fluidity, reducing the amount of unreacted monomer through improvement of the polymerization conversion rate, and so forth.

The above examples may be selected as appropriate depending on the required properties of the methacrylic resin composition according to the present embodiment.

In a case in which the aromatic vinyl monomer unit (C-1) is used, the content thereof when the total amount of the monomer unit (A) and the structural unit (B) is taken to be 100 mass % is preferably 23 mass % or less, more preferably 20 mass % or less, even more preferably 18 mass % or less, further preferably 15 mass % or less, and even further preferably 10 mass % or less in view of the balance of heat resistance, residual monomer reduction, and fluidity.

In a case in which the aromatic vinyl monomer unit (C-1) is used together with the maleimide-based structural unit (B-1) described above, a ratio (mass ratio) of the content of the monomer unit (C-1) relative to the content of the structural unit (B-1) (i.e., (C-1) content/(B-1) content) is preferably 0.3 to 5 from a viewpoint of processing fluidity in molding processing, an effect of silver streak reduction through residual monomer reduction, and so forth.

From a viewpoint of maintaining good color tone and heat resistance, the upper limit for this ratio is preferably 5 or less, more preferably 3 or less, and even more preferably 1 or less. Moreover, from a viewpoint of residual monomer reduction, the lower limit for this ratio is preferably 0.3 or more, and more preferably 0.4 or more.

One of such aromatic vinyl monomers (C-1) may be used individually, or two or more of such aromatic vinyl monomers (C-1) may be used in combination.

[Acrylic Acid Ester Monomer Unit (C-2)]

Although no specific limitations are placed on monomers that can be used to form an acrylic acid ester monomer unit (C-2) included in the methacrylic resin according to the present embodiment, an acrylic acid ester monomer represented by the following general formula (10) is preferable.

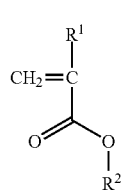

(10)

In general formula (10), $R^1$ represents a hydrogen atom or an alkoxy group having a carbon number of 1 to 12, and $R^2$ represents an alkyl group having a carbon number of 1 to 18.

The monomer used to form the acrylic acid ester monomer unit (C-2) is preferably methyl acrylate, ethyl acrylate, n-propyl acrylate, n-butyl acrylate, sec-butyl acrylate, 2-ethylhexyl acrylate, cyclohexyl acrylate, phenyl acrylate, or the like, and more preferably methyl acrylate, ethyl acrylate, or n-butyl acrylate from a viewpoint of increasing weathering resistance, heat resistance, fluidity, and thermal stability in the case of a methacrylic resin according to the present embodiment, and is even more preferably methyl acrylate or ethyl acrylate from a viewpoint of ease of acquisition.

One type of acrylic acid ester monomer unit (C-2) may be used individually, or two or more types of acrylic acid ester monomer units (C-2) may be used together.

In a case in which an acrylic acid ester monomer unit (C-2) is used, the content thereof when the total amount of the monomer unit (A) and the structural unit (B) is taken to be 100 mass % is preferably 5 mass % or less, more preferably 3 mass % or less, even more preferably 1 mass % or less from a viewpoint of heat resistance and thermal stability.

[Vinyl Cyanide Monomer Unit (C-3)]

Examples of monomers that may be used to form a vinyl cyanide monomer unit (C-3) included in the methacrylic resin according to the present embodiment include, but are not specifically limited to, acrylonitrile, methacrylonitrile, and vinylidene cyanide. Of these examples, acrylonitrile is preferable from a viewpoint of ease of acquisition and imparting chemical resistance.

One type of vinyl cyanide monomer unit (C-3) may be used individually, or two or more types of vinyl cyanide monomer units (C-3) may be used together.

In a case in which a vinyl cyanide monomer unit (C-3) is used, the content thereof when the total amount of the monomer unit (A) and the structural unit (B) is taken to be 100 mass % is preferably 15 mass % or less, more preferably 12 mass % or less, and even more preferably 10 mass % or less from a viewpoint of solvent resistance and retention of heat resistance.

[Monomer Unit (C-4) Other than (C-1) to (C-3)]

Examples of monomers that may be used to form a monomer unit (C-4) other than (C-1) to (C-3) that is included in the methacrylic resin according to the present embodiment include, but are not specifically limited to, unsaturated nitriles such as acrylonitrile and methacrylonitrile; amides such as acrylamide and methacrylamide; products obtained through esterification of both end hydroxy groups of ethylene glycol or an oligomer thereof with acrylic acid or methacrylic acid, such as ethylene glycol di(meth)acrylate, diethylene glycol di(meth)acrylate, triethylene glycol di(meth)acrylate, and tetraethylene glycol di(meth)acrylate; products obtained through esterification of two alcohol hydroxy groups with acrylic acid or methacrylic acid such as neopentyl glycol di(meth)acrylate, di(meth)acrylate etc.; products obtained through esterification of polyhydric alcohol derivatives such as trimethylol propane and pentaerythritol with acrylic acid or methacrylic acid; and polyfunctional monomers such as divinylbenzene. One type of the monomer that may be used to form a monomer unit (C-4) may be used individually, or two or more types of the monomers that may be used to form a monomer unit (C-4) may be used together.

Among the monomers described above that may be used to form the monomer unit (C), at least one selected from the group consisting of methyl acrylate, ethyl acrylate, styrene, and acrylonitrile is preferable from a viewpoint of ease of acquisition.

The content of the other vinyl monomer unit (C) that is copolymerizable with a methacrylic acid ester monomer when the methacrylic resin is taken to be 100 mass % is 0 mass % to 20 mass %, preferably 0 mass % to 18 mass %, and more preferably 0 mass % to 15 mass % from a viewpoint of increasing the effect of imparting heat resistance due to the structural unit (B).

Particularly in a case in which a crosslinkable polyfunctional (meth)acrylate having a plurality of reactive double bonds is used for the monomer unit (C), the content of the monomer unit (C) is preferably 0.5 mass % or less, more preferably 0.3 mass % or less, and even more preferably 0.2 mass % or less from a viewpoint of polymer fluidity.

In the present embodiment, the content of the structural unit (B) when the total amount of the structural unit (B) and the monomer unit (C) is taken to be 100 mass % is preferably 45 mass % to 100 mass % from a viewpoint of heat resistance and optical properties of the methacrylic resin. In such a case, the content of the structural unit (C) is 0 mass % to 55 mass %. Moreover, the content of the structural unit (B) in this case is preferably 50 mass % to 100 mass %, more preferably 50 mass % to 90 mass %, and even more preferably 50 mass % to 80 mass %.

One type of the methacrylic resin may be used individually, or two or more types of the methacrylic resins may be used together.

The following describes properties of the methacrylic resin according to the present embodiment.

<Weight Average Molecular Weight and Molecular Weight Distribution>

The weight average molecular weight (Mw) of the methacrylic resin according to the present embodiment is 65,000 to 300,000.

By setting the weight average molecular weight of the methacrylic resin according to the present embodiment within the range set forth above, the methacrylic resin and the methacrylic resin composition have excellent fluidity and excellent mechanical strength, such as Charpy impact strength. From a viewpoint of maintaining mechanical strength, the weight average molecular weight is preferably 65,000 or more, more preferably 70,000 or more, even more preferably 80,000 or more, and further preferably 100,000 or more. Moreover, from a viewpoint of ensuring fluidity in molding processing, the weight average molecular weight is preferably 250,000 or less, more preferably 230,000 or less, even more preferably 220,000 or less, further preferably 200,000 or less, even further preferably 180,000 or less, and particularly preferably 170,000 or less.

The molecular weight distribution (weight average molecular weight (Mw)/number average molecular weight (Mn)) of the methacrylic resin is preferably 1.5 to 5 in view of the balance of fluidity, mechanical strength, and solvent resistance. The molecular weight distribution is more preferably 1.5 to 4.5, even more preferably 1.6 to 4, further preferably 1.6 to 3, and even further preferably 1.5 to 2.5.

The weight average molecular weight (Mw) and the number average molecular weight (Mn) can be measured by gel permeation chromatography (GPC). Specifically, standard methacrylic resins that can be acquired as reagents and have monodisperse weight average molecular weight, number average molecular weight, and peak molecular weight that are known in advance and an analysis gel column that elutes higher molecular weight components earlier are used to prepare a calibration curve in advance from the elution time and weight average molecular weight of these standard methacrylic resins. Next, the weight average molecular weight and the number average molecular weight of a methacrylic resin sample that is a measurement target can be determined from the prepared calibration curve. Specifically, measurement can be performed by a method described in the subsequent EXAMPLES section.

<Proportion of Components within Specific Molecular Weight Ranges>

In the methacrylic resin according to the present embodiment, the content of components having a weight average molecular weight of 10,000 or less as measured by gel permeation chromatography (GPC) is preferably 0.1 mass % to 5.0 mass % from a viewpoint of improving processing fluidity, reducing poor external appearance of a molded article in molding (for example, silver marks referred to as silver streaks), and preventing adhesion to a roller in film production.

A content of 0.1 mass % or more enables improvement of processing fluidity. The lower limit for this content is preferably 0.2 mass % or more, more preferably 0.5 mass % or more, and even more preferably 0.6 mass % or more. A content of 5 mass % or less can reduce poor surface appearance (for example, by reducing silver streaks in molding), improve mold release in molding, inhibit adhesion to a roller in film production, and inhibit splitting when a film is held in stretching. The upper limit for this content is more preferably 4.0 mass % or less, even more preferably 3.0 mass % or less, and particularly preferably 2.0 mass % or less.

The content of components having a weight average molecular weight of 10,000 or less can be determined, for example, from an area ratio obtained from a GPC elution curve. Specifically, when the start point of the elution curve is taken to be A, the end point of the elution curve is taken to be B, a point on the base line at the elution time for a weight average molecular weight of 10,000 is taken to be X, and a point on the GPC elution curve at this elution time is taken to be Y as illustrated in FIG. 1, the content (mass %) of components having a weight average molecular weight of 10,000 or less can be determined as the area surrounded by a curve BY, a line segment BX, and line segment XY as a proportion relative to the area of the GPC elution curve.

Measurement can be suitably performed by a method described in the subsequent EXAMPLES section.

In the methacrylic resin according to the present embodiment, the content of components having a weight average molecular weight of more than 10,000 and not more than 50,000 is preferably 10.0 mass % to 25.0 mass %.

A content of 10.0 mass % to 25.0 mass % can inhibit the formation of streaks in film molding processing and provides improvement in terms of preventing adhesion to a roller in film molding. From a viewpoint of imparting a good balance of processing properties such as processing fluidity, streak inhibition, and touch roller adhesion inhibition, the lower limit for this content is more preferably 12.0 mass % or more, and even more preferably 13.0 mass %, and the upper limit for this content is more preferably 24.0 mass % or less.

The content of components having a weight average molecular weight of more than 10,000 and not more than 50,000 can be determined in the same way as the content of components having a weight average molecular weight of 10,000 or less.

In the methacrylic resin according to the present embodiment, a ratio (b/a) of the content (b) of components having a weight average molecular weight of more than 50,000 relative to the content (a) of components having a weight average molecular weight of more than 10,000 and not more than 50,000 is preferably 2.5 to 8.5 from a viewpoint of obtaining a good balance of thermal stability and processability.

With regards to the ratio of high molecular weight components and low molecular weight components, due to the influence of viscosity difference between high molecular weight components and low molecular weight components in heated processing, a large ratio of low molecular weight components tends to provide excellent processing fluidity but increases roller adhesion in film processing, whereas a large ratio of high molecular weight components tends to facilitate formation of streaks in film processing.

In order to impart a good balance of the properties of both while providing improvement in terms of adhesion prevention, the ratio is preferably 3.0 or more, and more preferably 3.5 or more. On the other hand, in a case in which further improvement in terms of streaks in film processing is desirable, the ratio is preferably 8.0 or less, and more preferably 7.5 or less.

<Total Content of Specific Components Including Dimers, Trimers, and the Like that are any Combination of the Monomers (A) to (C)>

In the methacrylic resin according to the present embodiment, the total content of specific components including dimers, trimers, and the like that are any combination of the monomer (A), the monomer forming the structural unit (B), and the monomer (C) (hereinafter referred to as "specific components") is necessarily 0.01 mass % to 0.40 mass % from a viewpoint of preventing adhesion to a mold or roller in molding processing, and inhibiting foaming in film production. Considering the balance of external appearance and adhesion, the upper limit is preferably 0.35 mass % or less, even more preferably 0.30 mass % or less, particularly preferably 0.28 mass % or less. In a case in which fluidity in molding processing is necessarily considered, the lower limit is preferably 0.02 mass % or more.

When the total content of the specific components is within any of the ranges set forth above, adhesion to a mold or film roller in molding processing can be inhibited, and molding processability can be improved. However, a content of less than 0.01 mass % is not preferable because a complicated process is required to obtain such a content.

The specific components in the present embodiment include a dimer component and a trimer component including a monomer other than methyl methacrylate monomer, and preferably include a dimer and a trimer including a monomer of the component (B) and/or the component (C).

Specific examples of the dimer include a dimer including a combination of the monomer (A) and a monomer included in the structural unit (B), a dimer including a combination of the monomer (A) and the monomer (C), a dimer including a combination of a monomer included in the structural unit (B) and the monomer (C), a dimer including a combination of a monomer included in the structural unit (B), and a dimer including a combination of the monomer (C).

Moreover, specific examples of the trimer include a trimer including a combination of the monomer (A), a monomer included in the structural unit (B) and the monomer (C), a trimer including a combination of the monomer (A) and a monomer included in the structural unit (B), a trimer including a combination of the monomer (A) and the monomer (C), a trimer including a combination of a monomer included in the structural unit (B) and the monomer (C), a trimer including a combination of a monomer included in the structural unit (B), and a trimer including a combination of the monomer (C).

The total content of the specific components can be determined by gas chromatography/mass spectrometry (GC/MS) measurement.

The specific components in the present embodiment also include components having similar volatility properties to these dimers and trimers in GC/MS, and components of unidentifiable structure. Accordingly, the content of the specific components indicates the total content of components detected in a specific retention time range in GC/MS.

In terms of suitable columns that can be used in GC/MS measurement, a non-polar or slightly polar column is preferable, and a column having 5% phenyl-95% methylpolysiloxane as a stationary phase is more preferable. Specific examples include, 007-2, CP-Sil 8CB, DB-5, DB-5.625, DB-5ht, HP-5, HP-5 ms, OV®-5 (OV is a registered trademark in Japan, other countries, or both), PTE-5, PTE-SQ™, PAS-5, RSL-200, Rtx®-5 (Rtx is a registered trademark in Japan, other countries, or both), Rtx®-5 ms, SAC-5, SE®-54 (SE is a registered trademark in Japan, other countries, or both), SPB®-5 (SPB is a registered trademark in Japan, other countries, or both), ULTRA-2, XTI-5, SE®-52, BP-5, PE-2, ZB-5, AT®-5 (AT is a registered trademark in Japan, other countries, or both), and EC®-5 (EC is a registered trademark in Japan, other countries, or both).

Helium gas can be suitably used as a carrier gas. The gas flow rate is preferably approximately 1 mL/min and is preferably controlled so as to be constant during measurement.

The sample injection volume is preferably approximately 1 μL.

In GC/MS, measurement by an internal standard method can be suitably adopted. One example of a method that can be used is described in the subsequent EXAMPLES section. No specific limitations are placed on the internal standard substance other than being a substance that has a retention time different from the specific components, that does not overlap with peaks of other components, and that is a stable compound. Preferable examples of the internal standard substance include hydrocarbons such as nonane, decane, and dodecane that are observed before the specific components and octadecyl 3-(3,5-di-tert-butyl-4-hydroxyphenyl)propionate that is observed after the specific components. It is more preferable to use octadecyl 3-(3,5-di-tert-butyl-4-hydroxyphenyl)propionate observed after the specific components.

In a case in which octadecyl 3-(3,5-di-tert-butyl-4-hydroxyphenyl)propionate is used as the internal standard substance, the specific components including dimers and trimers are observed in a range from a retention time of 22 minutes until a retention time of 32 minutes after which a peak of the internal standard substance is detected. Here, the content ratio of the specific components is calculated from the area between these times and the area of the peak of the internal standard substance. The detection range for the specific components can be determined using data from the mass spectrum of peaks detected in GC/MS, and can be measured, for example, by a method described in the subsequent EXAMPLES section.

Note that in a situation in which a peak due to an additive, such as a thermal stabilizer, appears in the range mentioned above from the retention time of 22 minutes until the retention time of 32 minutes after which a peak of the internal standard substance is detected, calculation of the total content of the specific components is performed by subtracting an area value of the peak due to the additive from the total area value in the range mentioned above.

One example of a method by which a measurement sample may be prepared is a method described in the subsequent EXAMPLES section.

Furthermore, the total content of the specific components is, more specifically, a value determined by GC/MS measurement using a specific device and specific conditions that are described in the subsequent EXAMPLES section.

From a viewpoint of obtaining sufficient heat resistance, the glass transition temperature of the methacrylic resin according to the present embodiment is preferably 120° C. or higher, more preferably 122° C. or higher, even more preferably 123° C. or higher, further preferably 124° C. or higher, and particularly preferably 125° C. or higher.

The glass transition temperature can be measured by the midpoint method in accordance with ASTM D-3418. Specifically, the glass transition temperature can be measured by a method described in the subsequent EXAMPLES section.

(Methacrylic Resin Production Method)

No specific limitations are placed on the method by which the methacrylic resin according to the present embodiment is produced other than being a method by which the methacrylic resin according to the present embodiment set forth above can be obtained.

The methacrylic resin according to the present embodiment can be produced by bulk polymerization, solution polymerization, suspension polymerization, precipitation polymerization, or emulsion polymerization using monomers for forming the methacrylic acid ester monomer unit (A), the structural unit (B) having a cyclic structure-containing main chain, and, as necessary, the other vinyl monomer unit (C) that is copolymerizable with a methacrylic acid ester monomer. It is preferable that bulk polymerization or solution polymerization, and more preferable that solution polymerization is used in production of the methacrylic resin.

Moreover, production of the methacrylic resin according to the present embodiment may be a continuous process or a batch process.

In the production method of the methacrylic resin, the monomers are preferably polymerized by radical polymerization.

The following provides a specific description of a case in which production is carried out by a batch process using solution polymerization by radical polymerization as one example of a method of producing the methacrylic resin according to the present embodiment.

The one example of a method of producing the methacrylic resin according to the present embodiment includes a compounding step of adding the monomers into a reactor with an organic solvent as necessary, a polymerization step of adding a polymerization initiator into the reactor and carrying out a polymerization reaction of the monomers, and, as necessary, a devolatilization step of removing organic solvent and unreacted monomer.

((Compounding Step))

In the one example of a method of producing the methacrylic resin according to the present embodiment, a monomer for forming a methacrylic acid ester monomer unit (A), a monomer for forming a structural unit (B) having a cyclic structure-containing main chain, and, as necessary, a monomer for forming another vinyl monomer unit (C) that is copolymerizable with a methacrylic acid ester monomer are compounded with an organic solvent in a reactor (compounding step).

—Monomers—

The monomers are as previously described for the monomer units (A) to (C) of the methacrylic resin according to the present embodiment.

Note that a polymerization inhibitor may remain in the monomers that are used to an extent that the polymerization reaction is not excessively impaired. The content of residual polymerization inhibitor relative to the total amount of all monomers is preferably 10 mass ppm or less, more preferably 5 mass ppm or less, and even more preferably 3 mass ppm or less from a viewpoint of polymerization reactivity and handleability.

—Organic Solvent—

The optionally used organic solvent is preferably a good solvent for the methacrylic resin in view of removal efficiency in the subsequently described devolatilization step for removing residual monomer from the methacrylic resin.

In view of the solubility of the copolymer forming the methacrylic resin, the solubility parameter $\delta$ of the organic solvent is preferably 7.0 $(cal/cm^3)^{1/2}$ to 12.0 $(cal/cm^3)^{1/2}$, more preferably 8.0 $(cal/cm^3)^{1/2}$ to 11.0 $(cal/cm^3)^{1/2}$, and even more preferably 8.2 $(cal/cm^3)^{1/2}$ to 10.5 $(cal/cm^3)^{1/2}$.

The solubility parameter $\delta$ can be determined, for example, with reference to non-patent literature such as "New Values of the Solubility Parameters from Vapor Pressure Data" by K. L. Hoy in P76-P118 of "Journal of Paint Technology, Vol. 42, No. 541, February 1970", and P-VII/675-P714 of "Polymer Handbook, Fourth Edition" by J. Brandrup et al.

Note that 1 $(cal/cm^3)^{1/2}$ is approximately 0.489 $(MPa)^{1/2}$.

Specific examples of organic solvents that can be used include aromatic hydrocarbons such as toluene, xylene, ethylbenzene, and mesitylene; alicyclic hydrocarbons such as cyclohexane, methylcyclohexane, and decalin; and ketone solvents such as methyl ethyl ketone and methyl isobutyl ketone.

Moreover, organic solvent recovered in the devolatilization step after polymerization may be used as the organic solvent.

In a case in which the recovered organic solvent contains unreacted monomer components, the compounding may be performed by analyzing the content of unreacted monomers contained in the organic solvent, and then only adding the required amounts of monomers thereto.

The additive amount of the organic solvent used in the polymerization step of the methacrylic resin according to the present embodiment is preferably an amount that enables polymerization to proceed without precipitation of the copolymer or used monomers during production, and that can be easily removed.

In a case in which polymerization of the methacrylic resin is by solution polymerization, the specific amount of the organic solvent is preferably 10 parts by mass to 200 parts by mass when the total amount of all used monomers is taken to be 100 parts by mass. The amount of the organic solvent is more preferably 25 parts by mass to 200 parts by mass, even more preferably 50 parts by mass to 200 parts by mass, and further preferably 50 parts by mass to 150 parts by mass.

—Reactor—

The reactor may be selected as appropriate in consideration of the size required from a viewpoint of amounts of materials and heat removal.

L/D of the reactor is preferably 0.5 to 50, more preferably 1 to 25, and even more preferably 1 to 10 from a viewpoint of stirring efficiency of the polymerization reaction solution.

The amount of monomers and/or organic solvent supplied into the reactor may be any amount without any particular problems so long as sufficient heat removal is possible. Polymerization may be carried out in a fully filled state or may be carried out with a charging amount of 50% to 99% in the reactor. Moreover, polymerization may be carried out under reflux.

It is preferable that a stirring device is attached in the reactor. The stirring device that is used may, for example, be a stirring impeller such as a pitched-blade paddle impeller, a flat-blade paddle impeller, a propeller impeller, an anchor impeller, a Pfaudler impeller (swept back-blade impeller), a turbine impeller, a Brumagin impeller, a MAXBLEND impeller, a FULLZONE impeller, a ribbon impeller, a SuperMix impeller, an Intermig impeller, a specialized impeller, or an axial flow impeller. Of these examples, a pitched-blade paddle impeller, a Pfaudler impeller, a MAXBLEND impeller, or a FULLZONE impeller is suitable.

The stirring speed in polymerization depends on the type of stirring device that is used, the stirring efficiency of the stirring impeller, the capacity of the polymerization tank, and so forth. The stirring speed should enable sufficient stirred mixing both in a low viscosity state at the start of polymerization and a high viscosity state at a later stage of polymerization, and is preferably approximately 1 rpm to 500 rpm in view of polymerization stability.

The method by which the monomers are introduced into the reactor is not specifically limited so long as the effects disclosed herein are obtained, and the monomers may be premixed and then introduced into the reactor, or may be introduced into the reactor separately. It is preferable to premix some or all the monomers prior to introduction into the reactor in view of producibility and handleability.

When premixing is performed, some or all of an organic solvent that can be used in polymerization may be simultaneously mixed. In a case in which an organic solvent is used, it is preferable to use a solvent in which the monomers subjected to polymerization dissolve. The solubility parameter $\delta$ of the organic solvent is preferably 7.0 $(cal/cm^3)^{1/2}$ to 12.0 $(cal/cm^3)^{1/2}$.

In the compounding step, a molecular weight modifier or other additive (also used in the subsequently described polymerization step) besides the monomers and the organic solvent may be added in advance, as necessary, so long as the effects disclosed herein can be exhibited.

((Polymerization Step))

In the one example of a method of producing the methacrylic resin according to the present embodiment, a polymerization initiator and, as necessary, a molecular weight modifier, other additives, and additional monomer are subsequently added to the reactor after the compounding step, and a polymerization reaction of the monomers is carried out (polymerization step).

In the polymerization step, the polymerization reaction of the monomers is initiated by the start of addition of the polymerization initiator.

Note that the polymerization initiator may be added to the reactor after being dissolved in additional monomer and/or additional organic solvent.

—Polymerization Initiator—

The polymerization initiator used in the present embodiment may be any polymerization initiator that decomposes to generate active radicals at the polymerization temperature. The polymerization initiator may be selected such as to satisfy a half-life of 0.6 minutes to 60 minutes, and preferably 1 minute to 30 minutes at the polymerization temperature because it is necessary to reach the required polymerization conversion rate within the residence time. However, note that even an initiator having a half-life of longer than 60 minutes at the polymerization temperature can be used as a polymerization initiator that generates a suitable amount of active radicals for the present embodiment through charging of a specific amount in a single addition or over approximately 10 minutes. In order to achieve the required polymerization conversion rate in such a situation, the polymerization initiator is selected such as to satisfy a half-life of 60 minutes to 1,800 minutes, and preferably 260 minutes to 900 minutes at the polymerization temperature.

A suitable polymerization initiator for use can be selected as appropriate in consideration of the polymerization temperature and the polymerization time. For example, initiators described in the 13$^{th}$ edition of "Organic Peroxides" by NOF Corporation, technical documents of Atochem Yoshitomi, Ltd., "Azo Polymerization Initiators" by Wako Pure Chemical Industries, Ltd., and the like can be suitably used, and the half-life thereof can be easily determined from various constants and the like described therefor.

In a case in which radical polymerization is performed, the polymerization initiator may be, but is not limited to, organic peroxides such as di-t-butyl peroxide, lauroyl peroxide, stearyl peroxide, benzoyl peroxide, t-butyl peroxyneodecanate, t-butylperoxy pivalate, dilauroyl peroxide, dicumyl peroxide, t-butylperoxy-2-ethylhexanoate, 1,1-bis(t-butylperoxy)-3,3,5-trimethylcyclohexane, 1,1-bis(t-butylperoxy)cyclohexane (for example, Perhexa®C (is a registered trademark in Japan, other countries, or both)), acetyl peroxide, capriel peroxide, 2,4-dichlorobenzoyl peroxide, isbutyl peroxide, acetyl cyclohexylsulfonyl peroxide, t-butyl peroxypivalate, t-butylperoxy-2-ethylhexanoate, isopropyl peroxydicarbonate, iso-butyl peroxydicarbonate, sec-butyl peroxydicarbonate, n-butyl peroxydicarbonate, 2-ethylhexyl peroxydicarbonate, bis(4-t-butylcyclohexyl) peroxydicarbonate, t-amylperoxy-2-ethylhexanoate, 1,1,3,3-tetramethylbutyl peroxy ethylhexanoate, 1,1,2-trimethylpropyl peroxy-2-ethylhexanoate, 2,5-dimethyl-2,5-di(t-butylperoxy)hexane (for example, Perhexa®25B (Perhexa is a registered trademark in Japan, other countries, or both)), t-butyl peroxyisopropyl monocarbonate, t-amyl peroxyisopropyl monocarbonate, 1,1,3,3-tetramethylbutyl peroxyisopropyl monocarbonate, 1,1,2-trimethylpropyl peroxyisopropyl monocarbonate, 1,1,3,3-tetramethylbutyl peroxyisononanoate, 1,1,2-trimethylpropyl peroxyisononanoate, t-butyl peroxybenzoate, and so forth; azo compounds such as azobis isobutyronitrile, azobis isovaleronitrile, azobis dimethylvaleronitrile, azobis cyclohexanenitrile, 1,1-azobis(1-cyclohexanecarbonitrile), 2,2'-azobis-4-methoxy-2,4-azobis isobutyronitrile, 2,2'-azobis-2,4-dimethylvaleronitrile, 2,2'-azobis-2-methylbutyronitrile, 1,1'-azobis(1-acetoxy-1-phenylethane), dimethyl-2,2'-azobis isobutyrate, 4,4'-azobis-4-cyanovaleric acid, and so forth; and typical radical polymerization initiators.

These radical polymerization initiators may be used as redox based polymerization initiators combined with an appropriate reductant.

One polymerization initiator may be used individually, or two or more polymerization initiators may be used in combination.

The polymerization initiator is added in an amount required to obtain a desired polymerization rate in the polymerization reactor.

In the polymerization reaction, the degree of polymerization can be increased by increasing the supplied amount of polymerization initiator, but use of a large amount of initiator tends to reduce the overall molecular weight, and reduce polymerization stability due to excessive heat caused by an increase in the amount of heat generated in polymerization.

From a viewpoint of facilitating the achievement of the desired molecular weight and ensuring polymerization stability, the amount of the polymerization initiator that is used per 100 parts by mass, in total, of all used monomers is preferably 0 parts by mass to 1 part by mass, more preferably 0.001 parts by mass to 0.8 parts by mass, and even more preferably 0.01 parts by mass to 0.5 parts by mass. The additive amount of the polymerization initiator can be selected as appropriate in consideration of the temperature at which polymerization is performed and the half-life of the initiator.

In the method of producing the methacrylic resin according to the present embodiment, it is preferable that the amount of radicals in the polymerization reaction system is optimized from (a) a viewpoint of restricting the amount of oligomers (for example, dimers and trimers) and low molecular weight components (for example, components having a weight average molecular weight of 500 to 10,000) produced in a later stage of polymerization, (b) a viewpoint of increasing the polymerization conversion rate, (c) a viewpoint of increasing the molecular weight of the resultant methacrylic resin, and (d) a viewpoint of polymerization stability through suppression of excessive heat in polymerization.

More specifically, in the present embodiment, it is preferable that the type of initiator, amount of initiator, polymerization temperature, and so forth are appropriately selected such that a ratio of the total amount of radicals generated by the polymerization initiator relative to the total amount of unreacted monomers remaining in the reaction system is maintained constantly at a specific value or less.

The following describes a suitable addition method of the polymerization initiator in the polymerization step.

This method restricts the amount of radicals generated in polymerization such that the total amount of components in the methacrylic resin and the amount of components having a weight average molecular weight of 10,000 or less can be kept within a desired range.

In the present embodiment, when the total time from the start of addition of the polymerization initiator to the end of addition of the polymerization initiator is taken to be B hours, it is preferable that in a period from the start of addition of the polymerization initiator to a time 0.5×B hr, there is at least one instance in which the additive amount of the polymerization initiator per unit time is less than the additive amount of the polymerization initiator per unit time at the start of addition (condition (i)).

In particular, from a viewpoint of optimizing the radical concentration, it is preferable that the addition rate is gradually reduced.

In the present embodiment, in addition to condition (i), the additive amount of the polymerization initiator per unit time during a period from a time 0.01×B hr after the start of addition of the polymerization initiator to a time 0.3×B hr after the start of addition is preferably 70% or less of the additive amount of the polymerization initiator per unit time at the start of addition (condition (ii)), more preferably 60% or less, even more preferably 50% or less, and particularly preferably 40% or less.

For example, in a case in which the addition rate (additive amount per unit time) of the polymerization initiator at the start of polymerization is 100 ppm/hr and the total time from the start of addition of the polymerization initiator to the end of addition of the polymerization initiator (B hr) is 10 hr, it is preferable that the addition rate (additive amount per unit time) during a period from 0.1 hr after the start of addition of the polymerization initiator to 3 hr after the start of addition is 70 ppm/hr or less.

A case in which a constant amount of the polymerization initiator is added at the start of polymerization and the polymerization initiator is fed at a constant rate does not satisfy condition (ii). For example, a case in which immediately after one third (⅓) of the required amount of the polymerization initiator is initially loaded in one shot, remaining two thirds (⅔) of the required amount is loaded over a specific time (for example, 3 hours) does not satisfy condition (ii) since the addition rate is changed at a time 0 hr after the start of addition of the polymerization initiator.

In addition to the above, it is more suitable in the present embodiment that the average additive amount of the polymerization initiator per unit time during a period from a time 0.01×B hr after the start of addition of the polymerization initiator to a time 0.3×B hr after the start of addition is preferably 70% or less of the average additive amount of the polymerization initiator per unit time during a period from the start of addition of the polymerization initiator to a time 0.01×B hr after the start of addition, more preferably 60% or less, even more preferably 50% or less, and particularly preferably 40% or less.

In the present embodiment, in addition to condition (i), the additive amount of the polymerization initiator per unit time during a period from a time 0.7×B hr after the start of addition of the polymerization initiator to a time 1.0×B hr after the start of addition is preferably 25% or less of the additive amount per unit time at the start of addition (condition (iii)), more preferably 20% or less, and even more preferably 18% or less.

For example, in a case in which the addition rate (additive amount per unit time) of the polymerization initiator at the start of polymerization is 100 ppm/hr and the total time from the start of addition of the polymerization initiator to the end of addition of the polymerization initiator (B hr) is 10 hr, it is preferable that the addition rate (additive amount per unit time) during a period from 7 hr after the start of addition of the polymerization initiator to 10 hr after the start of addition is 25 ppm/hr or less.

In addition to the above, it is more suitable in the present embodiment that the average additive amount of the polymerization initiator per unit time during a period from a time 0.7×B hr after the start of addition of the polymerization initiator to a time 1.0×B hr after the start of addition is preferably 25% or less of the average additive amount of the polymerization initiator per unit time during a period from the start of addition of the polymerization initiator to a time 0.01×B hr after the start of addition, more preferably 20% or less, and even more preferably 18% or less.

Conditions (ii) and (iii) are more preferably adopted in combination.

Furthermore, in the present embodiment, in addition to condition (i), it is preferable that when the total additive amount of the polymerization initiator is taken to be 100 mass %, the additive amount of the polymerization initiator during a period from a time 0.5×B hr after the start of addition of the polymerization initiator to a time 1.0×B hr after the start of addition is 20 mass % to 80 mass % (condition (iv)), more preferably 20 mass % to 70 mass %, and even more preferably 20 mass % to 60 mass %.

Moreover, in the present embodiment, in addition to condition (i), the polymerization reaction time during which the polymerization reaction of the monomers is carried out is preferably 1.0×B hr to 5.0×B hr (condition (v)), more preferably 1.0×B hr to 4.5×B hr, and even more preferably 1.0×B hr to 4.0×B hr.

Conditions (iv) and (v) are more preferably adopted in combination.

In the case of any of (i) to (v), the method by which the polymerization initiator is supplied is preferably through dissolving the polymerization initiator in a monomer and/or organic solvent used in the polymerization reaction in advance and then supplying the polymerization initiator therewith from a viewpoint of supply stability. The monomer and/or organic solvent that is used is preferably the same as used in the polymerization reaction. It is more preferable that the polymerization initiator is supplied in a dissolved state in an organic solvent from a viewpoint of avoiding blockage of polymerization piping and the like.

—Molecular Weight Modifier—

Examples of molecular weight modifiers that may optionally be used include chain transfer agents and iniferters.

In the production process of the methacrylic resin contained in the methacrylic resin composition according to the present embodiment, the molecular weight of the produced polymer can be controlled to an extent that the objectives of this disclosure are not impeded.

The molecular weight can be controlled through use of a chain transfer agent such as alkyl mercaptans, dimethylacetamide, dimethylformamide, or triethylamine; an iniferter such as dithiocarbamates, triphenylmethyl azobenzene, or a tetraphenylethane derivative; or the like as the aforementioned chain transfer agent or iniferter.

In a case in which a chain transfer agent or iniferter such as described above is used, alkyl mercaptans are suitable in terms of handleability and stability. Examples of alkyl mercaptans that can be used include, but are not limited to, n-butyl mercaptan, n-octyl mercaptan, n-dodecyl mercaptan, t-dodecyl mercaptan, n-tetradecyl mercaptan, n-octadecyl mercaptan, 2-ethylhexyl thioglycolate, ethylene glycol thioglycolate, trimethylolpropane tris(thioglycolate), and pentaerythritol tetrakis(thioglycolate).

A molecular weight modifier such as described above can be appropriately added in accordance with the required molecular weight. In general, the molecular weight modifier is used within a range of 0.001 parts by mass to 3 parts by mass per 100 parts by mass, in total, of all used monomers.

Other methods of controlling the molecular weight include changing the polymerization method, adjusting the amount of polymerization initiator, and changing the polymerization temperature.

One of these methods of molecular weight control may be used individually, or two or more of these methods may be used together.

A chain transfer agent (molecular weight modifier) may be used in the methacrylic resin according to the present embodiment with the aim of adjusting the molecular weight and improving polymer thermal stability. The type of chain transfer agent that is used and the method of use thereof are not limited so long as the effects disclosed herein can be exhibited.

In the methacrylic resin according to the present embodiment, it is necessary to control the total amount of components including dimers and trimers to an appropriate amount. Moreover, from a viewpoint of controlling the amount of components having a weight average molecular weight of 10,000 or less to an appropriate amount, it is preferable that a method is selected that ensures that the amount of remaining chain transfer agent is not excessive relative to the amount of remaining monomer in the polymerization reaction system.

Suitable examples of methods of supplying the chain transfer agent include a method in which the chain transfer agent is dissolved in a monomer in advance, a method in which the chain transfer agent is added in a single addition and/or consecutively at a stage at which the polymerization conversion rate is 50% or less, a method in which the chain transfer agent is added in one addition and/or continuously in a period until the degree of polymerization is 90%, and a method in which the amount of the chain transfer agent that is added is gradually reduced.

—Other Additives—

No specific limitations are placed on other additives that may optionally be used so long as the effects disclosed herein can be exhibited, and such other additives may be selected as appropriate depending on the objective.

—Oxygen Concentration—

The dissolved oxygen concentration in the polymerization solution in the polymerization step is not specifically limited, but is preferably 10 ppm or less.

The dissolved oxygen concentration can be measured, for example, using a dissolved oxygen (DO) meter B-505 (produced by Iijima Electronics Corporation).

Examples of methods by which the concentration of dissolved oxygen can be reduced include a method in which an inert gas is bubbled into the polymerization solution, a method in which an operation of pressurizing the inside of a vessel containing the polymerization solution to approximately 0.2 MPa with an inert gas and then releasing the pressure is repeated prior to polymerization, and a method in which an inert gas is passed through a vessel containing the polymerization solution.

—Polymerization Temperature, Polymerization Time—

In a case in which the methacrylic resin is produced by solution polymerization, the polymerization temperature is not specifically limited so long as it is a temperature at which polymerization proceeds, but from a viewpoint of producibility, the polymerization temperature is preferably 50° C. to 200° C., more preferably 80° C. to 200° C., even more preferably 80° C. to 180° C., further preferably 80° C. to 160° C., and particularly preferably 90° C. to 160° C.

Although no specific limitations are placed on the polymerization reaction time other than being a time that enables achievement of the required degree of polymerization, the polymerization reaction time is preferably 0.5 hours to 15 hours, more preferably 1 hour to 12 hours, and even more preferably 1 hour to 10 hours from a viewpoint of producibility. Note that the polymerization reaction time is the time from the start of addition of the polymerization initiator until termination of the polymerization reaction, or the time from the start of addition of the polymerization initiator until the start of removal of the polymerization reaction solution from the reactor.

The method by which the polymerization reaction of the monomers is terminated in the polymerization step may be a commonly known method that is selected as appropriate depending on the reaction system.

((Devolatilization Step))

A devolatilization device may be used to remove organic solvent and unreacted monomer from a polymerization reaction product taken out of the polymerization reactor. Removed solvent may be reused in the polymerization reaction after undergoing a refinement operation.

A device that enables heat treatment of the polymerization reaction product at a temperature of 150° C. to 320° C., and also enables separation and collection of volatile content can be suitably used as the devolatilization device.

Examples include an extruder having a vent at one or a plurality of locations, an SC processor, a KRC kneader, a gear pump-equipped vacuum tank, a film evaporator for high viscous products EXEVA, and a flash drum. One of these devolatilization devices may be used individually, or two or more of these devolatilization devices may be used together.

Herein, it is preferable that the total residual volatile content contained in the resin after devolatilization in the devolatilization step is 1 mass % or less.

The production method set forth above enables production of the methacrylic resin according to the present embodiment.

(Methacrylic Resin Composition)

The methacrylic resin composition according to the present embodiment contains the methacrylic resin set forth above and may optionally further contain a rubbery polymer, another resin other than the methacrylic resin, and additives such as thermal stabilizers, lubricants, ultraviolet absorbers and so forth.

—Rubber Polymer—

A rubber polymer may be included in the methacrylic resin composition according to the present embodiment in a range of no more than 3.5 parts by mass per 100 parts by mass of the methacrylic resin. By containing preferably 0.5 parts by mass or more, more preferably 1 parts by mass or more, even more preferably 1.5 parts by mass or more of a rubber polymer, an effect of inhibiting component for adhesion to a roll of the component for HMD during HMD molding is achieved. A content of the rubber polymer of 3.5 parts by mass or less, preferably 3.0 parts by mass or less maintains optical properties of the resin.

No specific limitations are placed on the rubber polymer as long as it exhibits the aforementioned effect, and commonly known materials may be used.

For example, rubber particles having a multilayer structure, such as typical butadiene based ABS rubbers, acryl based rubbers, polyolefin based rubbers, silicone based rubbers, fluororubbers and so forth may be used.

In a case in which the component for HMD according to the present embodiment is required for high transparency, it is preferable of use a rubber polymer having a refractive index close to the aforementioned methacrylic resin, more preferable to use an acrylic rubber polymer.

A rubber polymer preferably used in the present embodiment may be, but is not limited to, the acrylic rubber polymers suggested in the following Example 1 to Example 3.

Example 1: The Rubber Polymer Disclosed in JPS60-17406B

The rubber polymer of Example 1 is multilayer-structured particles manufactured by the following process (A) to process (C).

Process (A): a first layer forming process of carrying out emulsion polymerization of methyl methacrylate alone or a mixture of methyl methacrylate and a monomer copolymerizable with methyl methacrylate so as to form a dispersion of the polymer mainly composed of methyl methacrylate with a glass transition point of 25° C. or higher.

Process (B): a second layer forming process in which to the resultant product of process (A), a mixture containing alkyl acrylate that forms a copolymer having a glass transition point of 25° C. or lower when polymerized, a monomer copolymerizable with this or a polyfunctional cross-linking agent, and 0.1% to 5% by mass of a polyfunctional grafting agent relative to the total weight of the mixture is added, followed by emulsion polymerization.

Process (C): a third layer forming process in which to the resultant product of the process (B), a methyl methacrylate or a monomer mixture mainly composed of methyl methacrylate which forms a polymer having a glass transition point of 25° C. or higher when polymerized is added, in which a chain transfer agent is sequentially increased, followed by emulsion polymerization in multi stages.

The multilayer-structured particles are multilayer-structured particles including an acrylic rubber of which the molecular weight of the third layer becomes gradually smaller toward the outside from the inside.

Example 2: The Rubber Polymer Disclosed in JPH08-245854A

The rubber polymer of Example 2 is the following acrylic multilayer-structured polymer powder.

The acrylic multilayer-structured polymer powder has a melting start temperature of the polymer of 235° C. or higher. The inner layer is at least one soft polymer layer having a glass transition temperature (Tg) of 25° C. or lower when polymerized alone. The outermost layer is a hard polymer layer including a polymer in which a Tg is 50° C. or higher when polymerized alone.

In the rubber polymer of Example 2, a ratio of fine powder is 40% by mass in which a particle diameter of the dried coagulated powder is 212 μm or less, and a porosity volume is 0.7 cc or less per unit area in which the pore diameter of the dried coagulated powder measured by a mercury porosimetry is 5 μm or less.

Example 3: The Rubber Polymer Disclosed in JPH07-068318B

The rubber polymer of Example 3 is a multilayer-structured acrylic polymer satisfying the following conditions (a) to (g).

The multilayer-structured acrylic polymer is a multilayer-structured acrylic polymer including:

(a) 25% to 45% by mass of an innermost hard layer polymer obtained by polymerizing a monomer mixture which includes 90% to 99% by mass of methyl methacrylate, 1% to 10% by mass of alkyl acrylate in which an alkyl group has a carbon number of 1 to 8, and 0.01% to 0.3% by mass of a graft-linking monomer copolymerizable with them which includes at least one kind selected from aryl, methallyl and crotyl ester of α,β-unsaturated carboxylic acid, (b) 35% to 45% by mass of a soft layer polymer obtained by polymerizing a monomer mixture which includes 70% to 90% by mass of n-butylacrylate, 10% to 30% by mass of styrene, and 1.5% to 3.0% by mass of a graft-linking monomer copolymerizable with them which includes at least one selected from the group consisting of aryl, methallyl and crotyl ester of α,β-unsaturated carboxylic acid, in the presence of the innermost hard layer polymer, and (c) 20% to 30% by mass of an outermost hard layer polymer obtained by polymerizing a monomer mixture which includes 90% to 99% by mass of methyl methacrylate in which an alkyl group has a carbon number of 1 to 8, in the presence of the polymer formed of the innermost hard layer and the soft layer, where (d) a mass ratio of soft layer polymer/(innermost hard layer polymer+soft layer polymer) ranges from 0.45 to 0.57, and (e) an average particle diameter ranges from 0.2 μm to 0.3 μm, and when the multilayer-structured acrylic polymer is fractionated with acetone, (f) the grafting ratio ranges from 20% to 40% by mass, and (g) the tensile elastic modulus of the acetone insoluble portion ranges from 1000 kg/m$^2$ to 4000 kg/m$^2$.

Other examples of the rubber polymer include the following particles.

For example, the three/four-layer-structured acrylic rubber particles as described in JPS55-27576B, JPS58-1694B, JPS59-36645B, JPS59-36646B, JPS62-41241B, JPS59-202213A, JPS63-27516A, JPS51-129449A, JPS52-56150A, JPS50-124647A, etc. may be used.

It is preferable that the rubber polymer included in the methacrylic resin composition according to the present embodiment has a multilayered structure.

In a case in which the rubber polymer has a multilayered structure, a larger layer number of the rubber polymer is capable of controlling the elasticity thereof in a more suitable range. However, regarding the film color tone, etc. when containing the rubber polymer, particles having a three-layered structure or more is preferable, and acrylic rubber particles having a three-layered structure or more or more is more preferable.

By using the rubber particles having a three-layered structure or more as the rubber polymer, there is a tendency that thermal aging in molding processing of the component for HMD according to the present embodiment deformation of the rubber polymer due to heating are inhibited, and heat resistance and transparency of the component for HMD are maintained.

A rubber polymer having a three-layered structure or more refers to rubber particles having a structure obtained by stacking a soft layer including a rubbery polymer and a hard layer including a glassy polymer. Preferable examples include particles having a three-layered structure formed by, in order from the inner side, hard layer (first layer)-soft layer (second layer)-hard layer (third layer).

By including hard layers on the innermost layer and the outermost layer, deformation of the rubber polymer tends to be inhibited, and by including a soft component on the central layer, excellent toughness tends to be imparted.

A rubber polymer including three layers may be formed by, for example, a multilayer-structured graft copolymer. The multilayer-structured graft copolymer may be manufactured with, for example, methyl methacrylate and a monomer copolymerizable with the methyl methacrylate.

The monomer copolymerizable with the methyl methacrylate may be, but is not limited to, commonly known monofunctional monomers such as such as (meth)acrylic acid, (meth)acrylates other than methyl methacrylate, styrene, α-methylstyrene and so forth, and polyfunctional monomers such as ethylene glycol di(meth)acrylate, polyethylene glycol di(meth)acrylate, 1,3-butylene glycol di(meth)acrylate, 1,4-butanediol di(meth)acrylate, triallyl isocyanurate, diallyl maleate, divinylbenzene, and so forth.

One monomer may be used individually, or two or more monomers may be used together as necessary.

Specifically, in a case where the rubber polymer has a three-layered structure, it is preferable that the copolymer forming the innermost layer is a copolymer using 65 mass % to 90 mass % of methyl methacrylate and 10 mass % to 35 mass % of another copolymerizable monomer copolymerizable with the methyl methacrylate.

Further, from a viewpoint of appropriately controlling the refractive index, it is preferable that in the copolymer, the copolymerizable monomer copolymerizable with the methyl methacrylate includes 0.1 mass % to 5 mass % of an acrylic acid ester monomer, 5 mass % to 35 mass % of an aromatic vinyl compound monomer, and 0.01 mass % to 5 mass % of a polymerizable polyfunctional monomer.

The acrylic acid ester monomer (forming the innermost layer in the copolymer) is preferably, but is not limited to, n-butyl acrylate, or 2-hexyl acrylate.

The aromatic vinyl compound monomer may be the same as the monomer used in the methacrylic resin, but from a viewpoint of adjusting the refractive index of the innermost layer so as to obtain excellent transparency of the film according to the present embodiment, styrene or a derivative thereof is preferable.

The copolymerizable polyfunctional monomer is preferably, but is not limited to, ethylene glycol di(meth)acrylate, polyethylene glycol di(meth)acrylate, 1,3-butylene glycol di(meth)acrylate, 1,4-butanediol di(meth)acrylate, allyl (meth)acrylate, triallyl isocyanurate, diallyl maleate, divinylbenzene, and so forth. One copolymerizable polyfunctional monomer may be used individually, or two or more copolymerizable polyfunctional monomers may be used together. Among these, allyl (meth)acrylate is more preferable.

The second layer of the rubber polymer including three layers, i.e. the soft layer, is a rubbery copolymer exhibiting rubber elasticity, which is important for imparting excellent impact strength on the film.

It is preferable that the second layer is formed by, for example, a copolymer of alkyl acrylate and a monomer copolymerizable with the alkyl acrylate, or a polymer of a copolymerizable polyfunctional monomer.

The alkyl acrylate may be, but is not limited to, methyl acrylate, ethyl acrylate, n-butyl acrylate, 2-ethyl hexyl acrylate, and so forth. One alkyl acrylate may be used individually, or two or more alkyl acrylates may be used together. In particular, n-butyl acrylate and 2-ethyl hexyl acrylate are preferable.

Moreover, the other monomer copolymerizable with the alkyl acrylate may be, but is not limited to, a common monomer. However, from a viewpoint of adjusting the refractive index of the second layer, so as to match it with the methacrylic resin and obtain excellent transparency, styrene or a derivative thereof is preferable.

The copolymerizable polyfunctional monomer is preferably, but is not limited to, ethylene glycol di(meth)acrylate, polyethylene glycol di(meth)acrylate, 1,3-butylene glycol di(meth)acrylate, 1,4-butanediol di(meth)acrylate, allyl (meth)acrylate, triallyl isocyanurate, diallyl maleate, divinylbenzene, and so forth. One monomer copolymerizable with the alkyl acrylate may be used individually, or two or more monomers copolymerizable with the alkyl acrylate may be used together.

In a case in which the rubber polymer has a three-layered structure, it is preferable that the outermost layer is formed by a copolymer including 70 mass % to 100 mass % of methyl methacrylate and 0 mass % to 30 mass % of another copolymerizable monomer copolymerizable with the methyl methacrylate.

The copolymerizable monomer copolymerizable with the methyl methacrylate forming the outermost layer is preferably, but is not limited to, n-butyl acrylate or 2-hexyl acrylate.

In a case the rubber polymer includes three layers, the rubber polymer may include a rubbery polymer having a crosslinked structure, and it is preferable that rubbery polymer having a crosslinked structure is included in the second layer.

The rubbery polymer is obtained by copolymerizing polyfunctional monomers, and a crosslinked structure may be formed in the polymer. The crosslinked structure in the rubbery polymer imparts appropriate rubber elasticity, and maintains its form in a dispersed state without dissolving in the monomer mixture.

The polyfunctional monomer for forming the crosslinked structure may be a compound copolymerizable with methyl methacrylate and methyl acrylate.

It is preferable that the amount of the polyfunctional monomer that is used is 0.1 mass % to 5 mass % relative to the entire second layer. An amount of 0.1 mass % or more imparts sufficient crosslinking effect, and an amount of 5 mass % or less enables appropriate crosslinking strength and excellent rubber elasticity effect. Further, an amount of the polyfunctional monomer that is used of 0.1 mass % or more maintains the form of the rubbery elastic body without dissolving or swelling the rubbery polymer even after performing a cast polymerization process.

It is preferable to use in the second layer a polyfunctional grafting agent for forming a graft linking that tightens affinity with the polymer of the third layer as described below.

The polyfunctional grafting agent is a polyfunctional monomer having different functional groups, and may be, but not limited to, allyl esters, etc. of acrylic acid, methacrylic acid, maleic acid, fumaric acid and so forth. Among these, allyl acrylate and allyl methacrylate are preferable.

It is preferable that the amount of the polyfunctional grafting agent that is used is 0.1 mass % to 3 mass % relative to the entire second layer. An amount of the polyfunctional grafting agent that is used of 0.1 mass % or more imparts sufficient grafting effect, and an amount of the polyfunctional grafting agent that is used of 3 mass % or less avoids deterioration of rubber elasticity.

When polymerizing the third layer (the outermost layer), in order to improve affinity with the methacrylic resin, a chain transfer agent may be used to adjust the molecular weight.

In order to improve transparency of the component for HMD according to the present embodiment, it is necessary to match with each other the refractive indexes of the dispersed rubber polymer and methacrylic resin. However, in a case in which alkyl acrylate is used as a main component in the second layer as described above, it is extremely difficult to completely math the refractive index of the second layer with the methacrylic resin. In order to match the refractive indexes, for example, in a case in which alkyl acrylate and styrene or a derivative thereof are copolymerized in the second layer, although the refractive indexes become approximately equal to each other and transparency is improved in a specific temperature region, if the temperature changes, transparency would be deteriorated due to difference of the refractive indexes.

Examples of methods for avoiding such phenomenon include a method disposing a first layer having a refractive index approximately matching with the methacrylic resin. Moreover, reducing the thickness of the second layer is also an effective method for avoiding deterioration of transparency of the component for HMD according to the present embodiment.

From a viewpoint of imparting impact strength on the film according to the present embodiment, a viewpoint of surface smoothness, and a viewpoint of obtaining a desired film thickness, the average particle size of the rubber polymer is preferably 0.03 µm to 1 µm, more preferably 0.05 µm to 0.7 µm, even more preferably 0.05 µm to 0.5 µm, further preferably 0.05 µm to 0.4 µm, and even further preferably 0.05 µm to 0.3 µm. An average particle size of 0.03 µm or more of the rubber polymer tends to obtain sufficient impact strength in the component for HMD according to the present embodiment. On the other hand, an average particle size of 1 µm or less obtains avoids generation of narrow rippled recesses on the surface of the component for HMD according to the present embodiment, and thereby obtains specularity. Further, in a case of heat molding, such average particle size inhibits deterioration of surface luster in a stretched part, and ensures transparency.

The method for measuring the average particle size of the rubber polymer may be a commonly known conventional method. Examples include the methods as described in the following (1) and (2).

(1) A part of a molded product of the methacrylic resin composition is cut out with a circular saw, so as to produce a sample for observation $RuO_4$ (ruthenic acid) staining and via ultrathin sectioning method. Sections of stained rubber particles is observed by using a transmission electron microscope (type: H-600) manufactured by Hitachi, Ltd., followed by photographing. Diameters of 20 representative particles printed at a high magnification were measured with a scale, and an average value of the diameters of the particles were obtained, so as to obtain the average particle size of the rubber particles.

(2) An emulsion of the rubber polymer is sampled, diluted until the solid content becomes 500 ppm, and measured of the absorbance at a wavelength of 550 nm by using a UV1200V spectrophotometer (manufactured by Shimadzu Corporation). From this value, a sample measured of the particle size with a transmission electron microscope photograph is measured of the absorbance similarly, and a calibration curve prepared thereby is used to obtain the average particle size.

In The aforementioned measuring methods (1) and (2) can obtain approximately equal particle size measurements.

From a viewpoint of transparency and temperature dependence of transparency in the component for HMD according to the present embodiment, the difference of the refractive index of the methacrylic resin and the refractive index of the rubber polymer is preferably 0.03 or less, more preferably 0.025 or less, even more preferably 0.02 or less.

—Other Resin—

The methacrylic resin composition according to the present embodiment may contain another resin other than the methacrylic resin and the rubber polymer set forth above in combination with the methacrylic resin.

The other resin may be any commonly known thermoplastic resin so long as the properties required of the methacrylic resin composition according to the present embodiment can be exhibited.

Examples of thermoplastic resins that can be used include, but are not limited to, polyolefin based resins such as polyethylene, and polypropylene; polystyrene based resins such as polystyrene, styrene/acrylonitrile copolymer (AS resin), styrene/maleic anhydride copolymer (SMA resin), and styrene/methacrylic acid copolymer (MS resin); polycarbonate based resins; poly(meth)acrylic acid ester based resins; acrylonitrile/butadiene/styrene copolymer (ABS resin); methyl methacrylate/butadiene/styrene copolymer (MBS resin); acrylonitrile/acrylic acid ester/styrene copolymer (AAS resin); butyl acrylate/acrylonitrile/styrene copolymer (BAAS resin); biodegradable resins such as polylactic acid; alloys of polycarbonate-ABS resin; polyester based resins (polybutylene terephthalate, polyethylene terephthalate, polypropylene terephthalate, polytrimethylene terephthalate, polyethylene naphthalate, etc.); polyamide based resins; polyphenylene ether based resin; polyphenylene sulfide based resins; thermoplastic resins such as polyimides, polyetherimides, polyacetals, cyclic olefin based resins, norbornene based resins, cellulose resins such as triacetyl cellulose, polyether ether ketone resins, polysulfones, polyphenylene oxide; and thermosetting resins such as phenol resin, melamine resin, silicone resin, and epoxy resin, and so forth.

In particular, AS resins and BAAS resins are preferable from a viewpoint of fluidity improvement, ABS resins and MBS resins are preferable from a viewpoint of impact resistance improvement, and polyester resins are preferable from a viewpoint of chemical resistance improvement. Moreover, polyphenylene ether resins, polyphenylene sulfide resins, phenolic resins, and the like are preferable from a viewpoint of improving flame retardance. Polycarbonate resins are preferable when it is necessary to impart heat resistance or impact resistance, or to adjust optical properties. Furthermore, acrylic resins have good compatibility with the methacrylic resin set forth above and are preferable for adjusting properties such as fluidity and impact resistance while maintaining transparency.

—Acryl Based Resin—

In a case in which poly(meth)acrylic acid ester based resin different from the methacrylic resin according to the present embodiment is used in combination with the methacrylic resin, the monomer represented by the following general formula (11) is suitably used as the monomer used for forming the methacryl acid ester based monomer unit included in the poly(meth)acrylic acid ester based resin.

(11)

In general formula (11), $R^1$ is a methyl group.

Moreover, $R^2$ represents a group having a carbon number of 1 to 12, and preferably a hydrocarbon group having a carbon number of 1 to 12. The group may be have a hydroxy group on a carbon atom thereof.

The methacrylic acid ester monomer indicated by general formula (11) may be, but is not limited to, butyl methacrylate, ethyl methacrylate, methyl methacrylate, propyl methacrylate, isopropyl methacrylate, cyclohexyl methacrylate, phenyl methacrylate, 2-ethylhexyl methacrylate, t-butylcyclohexyl methacrylate, phenyl methacrylate, benzyl methacrylate, 2,2,2-trifluoroethyl methacrylate, and so forth. From a viewpoint of from a viewpoint of ease of acquisition, etc., methyl methacrylate is preferable.

One methacrylic acid ester monomer may be used individually, or two or more methacrylic acid ester monomers may be used together.

From a viewpoint of the balance of heat resistance, thermal stability and fluidity, the methacrylic acid ester monomer unit is included by 80 mass % to 99.5 mass %, preferably 85 mass % to 99.5 mass %, more preferably 90 mass % to 99 mass %, even more preferably 92 mass % to 99.3 mass %, even further preferably 92 mass % to 99 mass %, and even further preferably 94 mass % to 99 mass % when the acryl based resin is taken to be 100 mass %.

The poly(meth)acrylic acid ester based resin includes the methacrylic acid ester monomer unit, and another vinyl based monomer unit copolymerizable with the methacrylic acid ester monomer unit.

The monomer used for forming the other vinyl based monomer unit copolymerizable with the methacrylic acid ester monomer unit contained in the poly(meth)acrylic acid ester based resin may be, but is not limited to, the acrylic acid ester monomer represented by the following general formula (12).

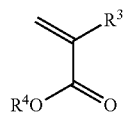

(12)

In general formula (12), $R^3$ is a hydrogen atom, and $R^4$ is an alkyl group having a carbon number of 1 to 18.

Examples of the monomer used for forming the other vinyl based monomer unit copolymerizable with the methacrylic acid ester monomer unit include, other than the aforementioned acrylic acid ester monomer, acrylic acid, methacrylic acid, etc.; unsaturated group-including divalent carboxylic acids such as maleic acid, fumaric acid, itaconic acid, cinnamic acid, etc., and esters and anhydrides thereof; aromatic vinyl monomers such as styrene based monomers (styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, isopropenylbenzene (α-methylstyrene), etc.), 1-vinylnaphthalene, 2-vinylnaphthalene, 1,1-diphenylethylene, isopropenyltoluene, isopropenylethylbenzene, isopropenylpropylbenzene, isopropenylbutylbenzene, isopropenylpentylbenzene, isopropenylhexylbenzene, isopropenyloctylbenzene, etc.; vinyl cyanide monomers such as acrylonitrile, methacrylonitrile, vinylidene cyanide, etc.; amides such as acryl amide, methacryl amide, etc.; ethylene glycols such as ethylene glycol di(meth)acrylate, diethylene glycol di(meth)acrylate, triethylene glycol di(meth)acrylate, tetraethylene glycol di(meth)acrylate, etc., or products obtained by esterifying hydroxy groups on both terminals of oligomers thereof with acrylic acid or methacrylic acid; products obtained through esterification of two alcohol hydroxy groups with acrylic acid or methacrylic acid such as neopentyl glycol di(meth)acrylate, di(meth)acrylate etc.; products obtained through esterification of polyhydric alcohol derivatives such as trimethylol propane and pentaerythritol with acrylic acid or methacrylic acid; and polyfunctional monomers such as divinylbenzene.

In particular, in the methacrylic resin according to the present embodiment, from a viewpoint of improving weather resistance, heat resistance, fluidity and thermal stability, monomer used for forming the other vinyl based monomer unit copolymerizable with the methacrylic acid ester monomer unit is preferably methyl acrylate, ethyl acrylate, n-propyl acrylate, n-butyl acrylate, sec-butyl acrylate, 2-ethylhexyl acrylate, and so forth, more preferably methyl acrylate, ethyl acrylate, or n-butyl acrylate. Further, from a viewpoint of ease of acquisition, methyl acrylate and ethyl acrylate are even more preferable.

One vinyl based monomer may be used individually, or two or more vinyl based monomers may be used together.

The content of the monomer used for forming the other vinyl based monomer unit copolymerizable with the methacrylic acid ester monomer unit in the poly(meth)acrylic acid ester based resin may be appropriately selected in a range without deteriorating the properties when used as a methacrylic resin composition. From a viewpoint of fluidity, heat resistance and thermal stability, the content is 0.5 mass % to 20 mass %, preferably 0.5 mass % to 15 mass %, more preferably 0.5 mass % to 10 mass %, even more preferably 0.7 mass % to 8 mass %, further preferably 1 mass % to 8 mass %, even further preferably 1 mass % to 6 mass % when the acryl based resin is taken to be 100 mass %.

Considering heat resistance, processing fluidity and thermal stability, the weight-average molecular weight (Mw) of the poly(meth)acrylic acid ester based resin may be appropriately selected so as to obtain desired heat resistance, fluidity and thermal stability. The weight to average molecular weight is preferably 20,000 to 300,000, more preferably 20,000 to 250,000, even more preferably 50,000 to 250,000, particularly preferably 70,000 to 230,000.

From a viewpoint of mechanical strength, solvent resistance and fluidity, the weight-average molecular weight of a mixed methacrylic resin of the methacryl based resin and the poly(meth)acrylic acid ester based resin is preferably 65,000 or more and 300,000 or less, more preferably 65,000 or more and 250,000 or less, and even more preferably 70,000 or more and 230,000 or less.

Moreover, the molecular weight distribution (Mw/Mn) of the poly(meth)acrylic acid ester based resin may be appropriately selected considering the balances of properties such as fluidity, mechanical properties, and so forth. The molecular weight distribution is preferably 1.5 to 7, more preferably 1.5 to 5, even and more preferably 1.5 to 4.

The weight-average molecular weight (Mw) and the number-average molecular weight (Mn) may be measured through gel permeation chromatography (GPC). Specifically, standard methacrylic resins that can be acquired as reagents and have monodisperse weight average molecular weight, number average molecular weight, and peak molecular weight that are known in advance and an analysis gel column that elutes higher molecular weight components earlier are used to prepare a calibration curve in advance from the elution time and weight average molecular weight of these standard methacrylic resins. Next, the weight average molecular weight and the number average molecular weight of a methacrylic resin sample that is a measurement target can be determined from the prepared calibration curve. Specifically, measurement can be performed by a method described in the subsequent EXAMPLES section.

The poly(meth)acrylic acid ester based resin can be produced by, but not limited to, bulk polymerization, solution polymerization, suspension polymerization, precipitation polymerization, or emulsion polymerization using the methacrylic acid ester monomer and the other vinyl monomer that is copolymerizable with a methacrylic acid ester monomer. The acryl based resin is preferably produced by bulk polymerization, solution polymerization, or suspension polymerization, more preferably solution polymerization, or suspension polymerization, and even more preferably suspension polymerization.

One thermoplastic resin may be used individually, or two or more thermoplastic resins may be used together.

In the methacrylic resin composition according to the present embodiment, in a case in which the aforementioned methacrylic resin and the other resin are used in combination, the compounding ratio of the other resin is not specifically limited as long as it is in a range capable of exhibiting the effect of this disclosure. However, from a viewpoint of a property imparting effect, the compounding ratio of the other resin is, relative to 100 mass % of a total amount of the methacrylic resin and the other resin: (i) in a case in which an acryl based resin is compounded as the other resin, preferably 95 mass % or less, more preferably 85 mass % or less, even more preferably 80 mass % or less, and further preferably 75 mass % or less, and (ii) in a case in which a resin other than poly (meth)acrylic acid ester based resin is compounded as the other resin, preferably 50 mass % or less, more preferably 45 mass % or less, even more preferably 40 mass % or less, further preferably 30 mass % or less, and even further preferably 20 mass % or less relative to 100 mass % of a total amount of the methacrylic resin and the other resin.

Moreover, from a viewpoint of a property imparting effect when compounding the other resin, the lower limit of the compounding amount of the other resin is preferably 0.1 mass % or more, more preferably 1 mass % or more, even more preferably 2 mass % or more, further preferably 3 mass % or more, and even further more preferably 5 mass % or more.

The type and content of the other resin may be appropriately selected depending on desired effects in a case in which the other resin is used in combination.

In the present embodiment, in a case in which the methacrylic resin and the other resin are used in combination, a poly(meth)acrylic acid ester based resin including at least 80 mass % to 99.5 mass % of a methacrylic acid ester monomer unit and having a weight-average molecular weight measured through gel permeation chromatography (GPC) of 20,000 to 300,000 is suitably used as the other resin.

In this case, from a viewpoint of color tone, the mixed resin preferably includes 10 mass % to 99 mass % of the methacrylic resin and 90 mass % to 1 mass % of the poly(meth)acrylic acid ester based resin, more preferably 15 mass % to 95 mass % of the methacrylic resin and 85 mass % to 5 mass % of the poly(meth)acrylic acid ester based resin, even more preferably 20 mass % to 80 mass % of the methacrylic resin and 80 mass % to 20 mass % of the poly(meth)acrylic acid ester based resin.

—Additives—

In the methacrylic resin composition according to the present embodiment, certain additives may be added to impart various properties such as rigidity and dimensional stability.

Examples of additives that can be used include, but are not limited to, various stabilizers such as ultraviolet absorbers, thermal stabilizers, and light stabilizers; plasticizers (paraffinic process oil, naphthenic process oil, aromatic process oil, paraffin, organic polysiloxane, mineral oil); flame retardants (for example, flame retardants based on silicone, silica, halogens, and phosphorus, such as organophosphorus compounds, red phosphorus, and inorganic phosphates); flame retardant aids (for example, antimony oxides, metal oxides, and metal hydroxides); antistatic agents (for example, polyamide elastomers, quaternary ammonium salts, pyridine derivatives, aliphatic sulfonates, aromatic sulfonates, aromatic sulfonate copolymers, sulfate ester salts, polyhydric alcohol partial esters, alkyl diethanol amines, alkyl diethanol amides, polyalkylene glycol derivatives, betaines, imidazoline derivatives, etc.); conductivity imparting agents; stress relaxation agents; release agents (alcohols, esters of an alcohol and a fatty acid, esters of an alcohol and a dicarboxylic acid, silicone oils, etc.); hydrolysis inhibitors; lubricants (for example, higher fatty acids such as stearic acid, behenic acid, zinc stearate, calcium stearate, magnesium stearate, etc.; metallic salts thereof; and higher fatty acid amides such as ethylene bis stearamide, etc.); impact resistance imparting agents; slidability modifiers (for example, low molecular weight polyethylene hydrocarbon, higher alcohol, polyhydric alcohols, polyglycols, glycerol, higher fatty acids, higher fatty acid metal salts, fatty acid amides, fatty acid esters of aliphatic alcohols, fatty acids and full esters or partial esters of polyhydric alcohols, full esters or partial esters of fatty acids and polyglycols, silicone, a fluorine resin, etc.); compatibilizers; nucleating agents; strengthening agents such as fillers; fluidity modifiers; dyes (nitroso dye, a nitro dye, an azo dye, a stilbene azo dye, a ketoimine dye, a triphenylmethane dye, a xanthene dye, an acridine dye, a quinoline dye, a methine/polymethine dye, a thiazole dye, an indamine/indophenol dye, an azine dye, an oxazine dye, a thiazine dye, a sulfide dye, an aminoketone/oxyketone dye, an anthraquinone dye, an indigoid dye, a phthalocyanine dye, etc.); sensitizers; colorants (inorganic colorants such as titanium oxide, carbon black, titanium yellow, an iron oxide-based colorant, ultramarine blue, cobalt blue, chromium oxide, spinel green, a lead chromate-based colorant, a cadmium-based colorant, etc.; organic colorants such as an azo-based colorant such as an azo lake colorant, a benzimidazolone colorant, a diarylide colorant or a condensed azo colorant, a phthalocyanine-based colorant such as phthalocyanine blue or phthalocyanine green, and a condensed polycyclic colorant such as an isoindolinone colorant, a quinophthalone colorant, a quinacridone colorant, a perylene colorant, an anthraquinone colorant, a perinone colorant or dioxazine violet, etc.; and metallic colorants such as an aluminum metallic colorant in the form of flakes, a spherical aluminum colorant used for improving weld appearance, a mica powder for a pearl metallic colorant, and one obtained by coating a polyhedral particle of an inorganic substance such as glass with a metal by plating or sputtering); thickeners; antisettling agents; drip inhibitors; fillers (for example, fibrous reinforcers such as glass fiber and carbon fiber, glass beads, calcium carbonate, talc, and clay); defoamers (organic defoamers such as a silicone defoamer, a surface-active agent, polyether, a higher alcohol, etc.); coupling agents; light scattering fine particles; rust inhibitors; antibacterial and antifungal agents; antifouling agents; and conductive polymers.

—Light Scattering Fine Particles—

The light scattering fine particles may be, but are not limited to, an inorganic fine particle such as alumina, titanium oxide, calcium carbonate, barium sulfate, silicon dioxide, a glass bead; an organic fine particle such as crosslinked styrene bead, crosslinked MS bead, and crosslinked siloxane based bead, and so forth. It is further possible to use as the light scattering fine particles a crosslinked hollow particle composed of a resin material having high transparency, such as an acrylic resin, polycarbonate based resin, MS resin, cyclic olefin based resin; and a hollow fine particle composed of glass, or the like.

From a viewpoint of scattering properties and ease of acquisition, the inorganic fine particle is preferably alumina, titanium oxide, etc.

One light scattering fine particle may be used individually, or two or more light scattering fine particles may be used together.

Here, it is preferable that the light scattering fine particles have a refractive index of 1.3 to 3.0, more preferably 1.3 to 2.5, and even more preferably 1.3 to 2.0. If the refractive index is 1.3 or more, scattering properties that are sufficient in practice are obtained in the film according to the present embodiment. If the refractive index is 3.0 or less, when the film according to the present embodiment is used for a part near a lamp, scattering near the lamp is suppressed, and luminance unevenness and color unevenness of the output light can be effectively prevented.

The refractive index is a value at a temperature of 20° C. based on D-rays (589 nm). Examples of the method of measuring the refractive index of the light scattering fine particles include a method comprising the steps of: immersing the light scattering fine particles in a liquid whose refractive index can be gradually changed; observing the interface of the light scattering fine particles while changing the refractive index of the liquid; and measuring the refractive index of the liquid when the interface of the light scattering fine particles become indistinct. An Abbe refractometer and the like can be used for measurement of the refractive index of the liquid.

Further, it is preferable that the above-described light scattering fine particles have an average particle size of 0.1 to 20 μm, more preferably is 0.2 to 15 μm, even more preferably is 0.3 to 10 μm, and still even more preferably is 0.4 to 5 μm.

It is preferable that the average particle size is 20 μm or less, because light loss due to back reflection and the like is suppressed, and incident light can be efficiently scattered to the light-emitting face side. Further, it is preferable that the average particle size is 0.1 μm or more, because the output light can be scattered, and the desired surface emission luminance and scattering properties can be obtained.

Further, from the perspectives of exhibiting a light scattering effect and uniformity of surface emission, it is preferable that the content of the light scattering fine particles in the methacrylic-based resin composition according to the present embodiment is, based on 100 parts by mass of the methacrylic-based resin, 0.0001 to 0.03 parts by mass, and more preferably is 0.0001 to 0.01 parts by mass.

—Thermal Stabilizer—

Examples of thermal stabilizers that can be used include, but are not limited to, hindered phenol antioxidants, phosphoric antioxidants, and sulfuric antioxidants. The methacrylic resin according to the present embodiment is suitable for use in various applications such as melt-extrusion, injection molding, and film molding applications. The heat history imparted in processing depends on the processing method, but may take various forms such as tens of seconds in the case of processing using an extruder to tens of minutes to several hours in the case of molding processing of a thin product or molding of a sheet.

In a case in which a long heat history is imparted, it is necessary to increase the additive amount of thermal stabilizer in order to obtain the desired thermal stability. From a viewpoint of inhibiting thermal stabilizer bleed-out and preventing adhesion of a film to a roller in film production, it is preferable to use a plurality of thermal stabilizers together. For example, it is preferable to use a hindered phenol antioxidant together with at least one selected from a phosphoric antioxidant and a sulfuric antioxidant.

One of such antioxidants may be used, or two or more of such antioxidants may be used together.

Examples of thermal stabilizers that can be used include, but are not specifically limited to, pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 3,3',3",5,5',5"-hexa-tert-butyl-a,a',a"-(mesitylene-2,4,6-triyl)tri-p-cresol, 4,6-bis(octylthiomethyl)-o-cresol, 4,6-bis(dodecylthiomethyl)-o-cresol, ethylenebis(oxyethylene) bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylene)methyl]-1,3,5-triazine-2,4,6(1H,3H,5H)-trione, 2,6-di-tert-butyl-4-(4,6-bis(octylthio)-1,3,5-triazin-2-ylamine)phenol, 2-[1-(2-hydroxy-3,5-di-tert-pentylphenypethyl]-4,6-di-tert-pentylphenyl acrylate, and 2-tert-butyl-4-methyl-6-(2-hydroxy-3-tert-butyl-5-methylbenzyl)phenyl acrylate.

In particular, pentaerythritol tetrakis[3-(3,5-di-tert-butyl-4-hydroxyphenyl)propionate], octadecyl-3-(3,5-di-t-butyl-4-hydroxyphenyl)propionate, and 2-[1-(2-hydroxy-3,5-di-tert-pentylphenypethyl]-4,6-di-tert-pentylphenyl acrylate are preferable.

Commercially available hindered phenol antioxidants may be used as these hindered phenol antioxidants as the thermal stabilizer. Examples of such commercially available phenol antioxidants include, but are not specifically limited to, Irganox® 1010 (Irganox is a registered trademark in Japan, other countries, or both; pentaerythritol tetrakis[3-(3,5-di-t-butyl-4-hydroxyphenyl)propionate]; produced by BASF), Irganox 1076 (octadecyl-3-(3,5-di-t-butyl-4-hydroxyphenyl)propionate; produced by BASF), Irganox 1330 (3,3',3",5,5',5"-hexa-t-butyl-a,a',a"-(mesitylene-2,4,6-triyl) tri-p-cresol; produced by BASF), Irganox 3114 (1,3,5-tris (3,5-di-t-butyl-4-hydroxybenzyl)-1,3,5-triazine-2,4,6(1H, 3H,5H)-trione; produced by BASF), Irganox 3125 (produced by BASF), ADK STAB AO-60 (pentaerythritol tetrakis[3-(3,5-di-t-butyl-4-hydroxyphenyl)propionate]; produced by Adeka Corporation), ADK STAB AO-80 (3,9-bis{2-[3-(3-t-butyl-4-hydroxy-5-methylphenyl)propionyloxy]-1,1-dimeth ylethyl}-2,4,8,10-tetraoxaspiro[5.5]undecane; produced by Adeka Corporation), Sumilizer® BHT (Sumilizer is a registered trademark in Japan, other countries, or both; produced by Sumitomo Chemical Co., Ltd.), Cyanox® 1790 (Cyanox is a registered trademark in Japan, other countries, or both; produced by Cytec Solvay Group), Sumilizer GA-80 (produced by Sumitomo Chemical Co., Ltd.), Sumilizer GS (2-[1-(2-hydroxy-3,5-di-tert-pentylphenyl)ethyl]-4,6-di-tert-pentylphenyl acrylate; produced by Sumitomo Chemical Co., Ltd.), Sumilizer GM (2-tert-butyl-4-methyl-6-(2-hydroxy-3-tert-butyl-5-methylbenzyl)phenyl acrylate; produced by Sumitomo Chemical Co., Ltd.), and vitamin E (produced by Eisai Co., Ltd.).

Of these commercially available phenolic antioxidants, Irganox 1010, ADK STAB AO-60, ADK STAB AO-80, Irganox 1076, Sumilizer GS, and the like are preferable in terms of thermal stability imparting effect with respect to the resin.

One of these hindered phenol antioxidants may be used individually, or two or more of these hindered phenol antioxidants may be used together.

Phosphoric antioxidants that can be used as the heat stabilizer may be, but are not limited to, tris(2,4-di-t-butylphenyl)phosphite, bis(2,4-bis(1,1-dimethylethyl)-6-methylphenyl)ethyl ester phosphorous acid, tetrakis(2,4-di-t-butylphenyl)(1,1-biphenyl)-4,4'-diyl bisphosphonite, bis(2,4-di-t-butylphenyl)pentaerythritol diphosphite, bis(2,6-di-t-butyl-4-methylphenyl)pentaerythritol diphosphite, bis(2,4-dicumylphenyl)pentaerythritol diphosphite, tetrakis(2,4-t-butylphenyl)(1,1-biphenyl)-4,4'-diyl bisphosphonite, di-t-butyl-m-cresyl-phosphonite, and 4-[3-[(2,4,8,10-tetra-tert-butyldibenzo[d,f][1,3,2]dioxaphosphepin)-6-yloxy]propyl]-2-methyl-6-tert-butylphenol.

The phosphorus antioxidant may be commercially available phosphorus antioxidants. Examples of such commercially available phosphorus antioxidants include, but are not limited to, Irgafos 168 (tris(2,4-di-t-butylphenyl) phosphite; produced by BASF), Irgafos 12 (tris[2-[[2,4,8,10-tetra-t-butyldibenzo[d,f][1,3,2]dioxaphosphepin-6-yl]oxy]ethyl] amine; produced by BASF), Irgafos 38 (bis(2,4-bis(1,1-dimethylethyl)-6-methylphenyflethyl phosphite, produced by BASF), ADEKASTAB 329K (ADK STAB-229K, produced by Adeka Corporation), ADEKASTAB PEP-36 (ADK STAB PEP-36, produced by Adeka Corporation), ADEKASTAB PEP-36A (ADK STAB PEP-36A, produced by Adeka Corporation), ADEKASTAB PEP-8 (ADK STAB PEP-8, produced by Adeka Corporation), ADEKASTAB HP-10 (ADK STAB HP-10, produced by Adeka Corporation), ADEKASTAB 2112 (ADK STAB 2112, produced by Adeka Corporation), ADEKASTAB 1178 (ADK STAB 1178, produced by Adeka Corporation), ADEKASTAB 1500 (ADK STAB 1500, produced by Adeka Corporation), Sandstab P-EPQ (produced by Cryant Corporation), Weston 618 (produced by GE Corporation), Weston 619G (produced by GE Corporation), Ultranox 626 (produced by GE Corporation), Sumilizer GP (4-[3-[(2,4,8,10-tetra-tert-butyldibenzo[d,f][1,3,2]dioxaphosphepin)-6-iloxy]propyl]-2-methyl-6-tert-butylphenol, produced by Sumitomo Chemical Co., Ltd.), HCA (9,10-dihydro-9-oxa-10-phosphaphenanthrene-10-oxide, produced by Sanko Co., Ltd.), and so forth.

Among these commercially available phosphorus antioxidants, from a viewpoint of a thermal stability imparting effect with respect to the resin and an effect of using in combination with various antioxidants, Irgafos 168, ADEKASTAB PEP-36, ADEKASTAB PEP-36A, ADEKASTAB HP-10, and ADEKASTAB 1178 are preferable, and ADEKASTAB PEP-36 and ADEKASTAB PEP-36A are particularly preferable.

One phosphorus antioxidant may be used individually, or two or more phosphorus antioxidants may be used together.

Examples of sulfuric antioxidants that can be used as the heat stabilizer include, but are not specifically limited to, 2,4-bis(dodecylthiomethyl)-6-methylphenol (Irganox 1726 produced by BASF), Irganox 1520L (produced by BASF), 2,2-bis[[3-(dodecylthio)-1-oxopropoxy]methyl]propan-1,3-diyl bis[3-(dodecylthio)propionate](ADK STAB AO-412S produced by Adeka Corporation), 2,2-bis[[3-(dodecylthio)-1-oxopropoxy]methyl]propan-1,3-diyl bis[3-(dodecylthio) propionate] (KEMINOX® PLS (KEMINOX is a registered trademark in Japan, other countries, or both) produced by Chemipro Kasei Kaisha, Ltd.), and di(tridecyl)-3,3'-thiodipropionate (AO-503 produced by Adeka Corporation).

Of these commercially available sulfuric antioxidants, ADK STAB AO-4125, KEMINOX PLS, and the like are preferable in terms of thermal stability imparting effect with respect to the resin.

One of these sulfuric antioxidants may be used individually, or two or more of these sulfuric antioxidants may be used together.

Although the content of the thermal stabilizer can be any amount that enables an effect of thermal stability improvement to be obtained, an excessive content may lead to problems such as bleed-out during processing. Accordingly, the content of the thermal stabilizer per 100 parts by mass of the methacrylic resin is preferably 5 parts by mass or less, more preferably 3 parts by mass or less, even more preferably 1 part by mass or less, further preferably 0.8 parts by mass or less, even further preferably 0.01 parts by mass to 0.8 parts by mass, and particularly preferably 0.01 parts by mass to 0.5 parts by mass.

—Lubricant—

Examples of the lubricant include, but are not limited to, fatty acid esters, fatty acid amides, fatty acid metallic salts, hydrocarbon based lubricants, alcohol based lubricants, and so forth.

Fatty acid esters that can be used as the lubricant are not specifically limited, and may be conventionally known ones.

Examples of the fatty acid ester include ester compounds of a fatty acid having a carbon number of 12 to 32 such as lauric acid, palmitic acid, heptadecanoic acid, stearic acid, oleic acid, arachidic acid, behenic acid, etc., and a monovalent aliphatic alcohol such as palmityl alcohol, stearyl alcohol, behenyl alcohol, etc., or a multivalent aliphatic alcohol such as glycerin, pentaerythritol, dipentaerythritol, sorbitan, etc.; and complex ester compounds of a fatty acid, a polybasic organic acid, and a monovalent aliphatic alcohol or a multivalent aliphatic alcohol. Examples of such fatty acid ester based lubricant include cetyl palmitate, butyl stearate, stearyl 4 stearate, stearyl citrate, glycerin monocaprylate, glycerin monocaprate, glycerin monolaurate, glycerin monopalmitate, glycerin dipalmitate, glycerin monostearate, glycerin distearate, glycerin tristearate, glycerin monooleate, glycerin dioleate, glycerin trioleate, glycerin monolinoleate, glycerin monobehenate, glycerin mono(12-hydroxy) stearate, glycerin di(12-hydroxy) stearate, glycerin tri(12-hydroxy) stearate, glycerin diacetomonostearate, glycerin citric acid fatty acid ester, pentaerythritol adipic acid stearic acid ester, montanic acid partially saponified ester, pentaerythritol tetrastearate, dipentaerythritol hexastearate, sorbitan tristearate, and so forth.

One fatty acid ester based lubricant may be used individually, or two or more fatty acid ester based lubricants may be used together.

Examples of commercially products include Rikemal series, Poem series, Rikester series, and Rikemaster series produced by Riken Vitamin Co., Ltd., Excel series, Rheodol series, Exceparl series, and Coconad series produced by Kao Corporation. Specifical Examples include Rikemal S-100, Rikemal H-100, Poem V-100, Rikemal B-100, Rikemal HC-100, Rikemal S-200, Poem B-200, Rikester EW-200, Rikester EW-400, Excel S-95, and Rheodol MS-50.

Fatty acid amide based lubricants are not specifically limited, and may be conventionally known ones.

Examples of the fatty acid amide based lubricant include saturated fatty acid amides such as lauric acid amide, palmitic acid amide, stearic acid amide, behenic acid amide, hydroxystearic acid amide, etc.; unsaturated fatty acid amides such as oleic acid amide, erucic acid amide, ricinoleic acid amide, etc.; substituted amides such as N-stearyl stearic acid amide, N-oleyl oleic acid amide, N-stearyl oleic acid amide, N-oleyl stearic acid amide, N-stearyl erucic acid amide, N-oleyl palmitic acid amide, etc.; methylol amides such as methylol stearic acid amide, methylol behenic acid amide, etc.; saturated fatty acid bisamides such as methylene-bis-stearic acid amide, ethylene-bis-capric acid amide, ethylene-bis-lauric acid amide, ethylene-bis-stearic acid amide (ethylene-bis-stearyl amide), ethylene-bis-isostearic acid amide, ethylene-bis-hydroxy stearic acid amide, ethylene-bis-behenic acid amide, hexamethylene-bis-stearic acid amide, hexamethylene-bis-behenic acid amide, hexamethylene-bis-hydroxy stearic acid amide, N,N'-distearyl adipic acid amide, N,N'-distearyl sebacic acid amide, etc.; unsaturated fatty acid bisamides such as ethylene-bis-oleic acid amide, hexamethylene-bis-oleic acid amide, N,N'-dioleyl adipic acid amide, N,N'-dioleyl sebacic acid amide, etc.; aromatic bisamides such as m-xylylene-bis-stearic acid amide, N,N'-distearyl isophthalic acid amide, etc., and so forth.

One fatty acid amide based lubricant may be used individually, or two or more fatty acid ester based lubricants may be used together.

Examples of commercially available products include Diamid series (produced by Nippon Kasei Chemical Co., Ltd.), Amide series (produced by Nippon Kasei Chemical Co., Ltd.), Nikka Amide series (produced by Nippon Kasei Chemical Co., Ltd.), Methylol Amide series, Bisamide series, Slipax series (produced by Nippon Kasei Chemical Co., Ltd.), Kao Wax series (produced by Kao Corporation), Fatty Acid Amide series (produced by Kao Corporation), ethylene-bis-stearic acid amides (produced by Dainichi Chemical Industry Co., Ltd.), and so forth.

Fatty acid metallic salts refer to metallic salts of higher fatty acids. Examples include lithium stearate, magnesium stearate, calcium stearate, calcium laurate, calcium ricinoleate, strontium stearate, barium stearate, barium laurate, barium ricinoleate, zinc stearate, zinc laurate, zinc ricinoleate, zinc 2-ethylhexanoate, lead stearate, dibasic lead stearate, lead naphthenate, calcium 12-hydroxystearate, lithium 12-hydroxystearate, and so forth. Among these, from a viewpoint of excellent processability and extremely excellent transparency of the obtained transparent resin composition, calcium stearate, magnesium stearate, and zinc stearate are particularly preferable.

Commercially available products include SZ series, SC series, SM series, SA series and so forth produced by Sakai Chemical Industry Co., Ltd.

From a viewpoint of maintaining transparency, in a case where the fatty acid metallic salts are used, it is preferable that the compounding amount is 0.2 mass % or less.

One lubricant may be used individually, or two or more lubricants may be used together.

A lubricant provided for use preferably has a decomposition start temperature of 200° C. or higher. The decomposition start temperature may be measured through a temperature of 1% loss in TGA.

The content of the lubricant is not specifically limited as long as an effect as a lubricant can be obtained. Regarding the risk of extrusion failure, etc. during processing due to bleeding out and slip of screw, the content of the lubricant is preferably 5 parts by mass or less, more preferably 3 parts by mass or less, even more preferably 1 parts by mass or less, further preferably 0.8 parts by mass or less, even further preferably 0.01 to 0.8 parts by mass, particularly preferably 0.01 to 0.5 parts by mass per 100 parts by mass of the methacrylic resin. The lubricant is preferably added at an amount in any of the ranges set forth above, because deterioration of transparency due to lubricant addition is inhibited, and adhesion to metal roll tends to be inhibited during film forming. In addition, problems such as peeling become unlikely to occur in long-term reliability test after secondary processing to the film such as primer coating.

—Ultraviolet Absorber—

Examples of ultraviolet absorbers that can be used include, but are not limited to, benzotriazole compounds, benzotriazine compounds, benzoate compounds, benzophenone compounds, oxybenzophenone compounds, phenol compounds, oxazole compounds, malonic acid ester compounds, cyanoacrylate compounds, lactone compounds, salicylic acid ester compounds, and benzoxazinone compounds.

Examples of benzotriazole compounds that can be used include 2,2'-methylenebis[4-(1,1,3,3-tetramethylbutyl)-6-(2H-benzotriazol-2-yl)phenol], 2-(3,5-di-tert-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-tert-butylphenol, 2-[5-chloro(2H)-benzotriazol-2-yl]-4-methyl-6-t-butylphenol, 2-(2H-benzotriazol-2-yl)-4,6-di-t-butylphenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl)phenol, methyl 3-(3-(2H-benzotriazol-2-yl)-5-t-butyl-4-hydroxyphenyl)propionate/polyethylene glycol 300 reaction product, 2-(2H-benzotriazol-2-yl)-6-(linear/branched dodecyl)-4-methylphenol, 2-(5-methyl-2-hydroxyphenyl)benzotriazole, 2-[2-hydroxy-3,5-bis(α,α-dimethylbenzyl)phenyl]-2H-benzotriazole, and 3-(2H-benzotriazol-2-yl)-5-(1,1-dimethylethyl)-4-hydroxy-C7-9 branched/linear alkyl esters.

Examples of benzotriazine compounds that can be used include 2-mono(hydroxyphenyl)-1,3,5-triazine compounds, 2,4-bis(hydroxyphenyl)-1,3,5-triazine compounds, and 2,4,6-tris(hydroxyphenyl)-1,3,5-triazine compounds. Specific examples include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3,5-triazine, 2,4,6-tris(2-hydroxy-4-methoxyphenyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropan-2-yloxy)phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazin e, and 2,4,6-tris(2-hydroxy-3-methyl-4-(1-(2-ethoxyhexyloxy)-1-oxopropan-2-yloxy)phenyl)-1,3,5-triazine.

Of these examples, an ultraviolet absorber having a 2,4-bis(2,4-dimethylphenyl)-6-[2-hydroxy-4-(3-alkyloxy-2-hydroxypropyloxy)-5-α-cumylphenyl]-s-triazine skeleton ("alkyloxy" refers to a long-chain alkyloxy group such as an octyloxy, nonyloxy, or decyloxy group) has high compatibility with amorphous thermoplastic resins, and particularly acrylic resins, and has excellent absorption properties.

Benzotriazole compounds and benzotriazine compounds are preferable as ultraviolet absorbers particularly from a viewpoint of resin compatibility and volatility upon heating, and benzotriazine compounds are preferable from a viewpoint of inhibiting decomposition of the ultraviolet absorber due to heating in extrusion processing.

One of such ultraviolet absorbers may be used individually, or two or more of such ultraviolet absorbers may be used together.

An ultraviolet absorber is normally added to absorb ultraviolet light and suppress transmission at from 200 nm to 380 nm. However, in the case of a thin film or the like, it is necessary to add a large amount of ultraviolet absorber, and transmission cannot be effectively suppressed through only a single type of ultraviolet absorber. To efficiently suppress transmission through a small amount of ultraviolet absorber, it is preferable to use two types in combination in the form of a compound having an absorption maximum at a wavelength of 200 nm to 315 nm and a compound having an absorption maximum at a wavelength of 315 nm to 380 nm. For example, it is preferable to use 2-(4,6-diphenyl-1,3,5-triazin-2-yl)-5-[2-(2-ethylhexanoyloxy)ethoxy]phenol (LA-46 produced by Adeka Corporation) having an absorption maximum at 280 nm to 300 nm in combination with at least one selected from the group consisting of 2,4-bis[2-hydroxy-4-butoxyphenyl]-6-(2,4-dibutoxyphenyl)-1,3,5-triazine (TINUVIN 460 produced by BASF), hydroxyphenyltriazine TINUVIN 477 (produced by BASF), and 2,4,6-tris(2-hydroxy-4-hexyloxy-3-methylphenyl)-1,3,5-triazine (LA-F70 produced by Adeka Corporation) having an absorption maximum at 350 nm to 380 nm.

The melting point (Tm) of the ultraviolet absorber is preferably 80° C. or higher, more preferably 100° C. or higher, even more preferably 130° C. or higher, and further preferably 160° C. or higher.

When the ultraviolet absorber is heated from 23° C. to 260° C. at a rate of 20° C./min, the weight loss rate of the ultraviolet absorber is preferably 50% or less, more preferably 30% or less, even more preferably 15% or less, further preferably 10% or less, and even further preferably 5% or less.

The amount of the ultraviolet absorber may be any amount so long as heat resistance, humid heat resistance, thermal stability, and molding processability are not impaired and the effects disclosed herein can be exhibited, but from a viewpoint of a risk of bleeding out, etc. during processing if the ultraviolet absorber is added excessively, the amount of the ultraviolet absorber per 100 parts by mass of the methacrylic resin is preferably 5 parts by mass or less, even more preferably 3 parts by mass or less, further preferably 2.5 parts by mass or less, further preferably 2 parts by mass or less, even further preferably 0.01 to 1.8 parts by mass.

—Light Stabilizer—

The light stabilizer may be, but is not limited to, a hindered amine based compound.

The hindered amine based compound is not specifically limited, but is preferably a compound including three or more cyclic structures. Here, it is preferable that the cyclic structures are at least one selected from the group consisting of aromatic rings, aliphatic rings, aromatic heterocycles and nonaromatic heterocycles; and in a case in which one compound includes two or more cyclic structures, these cyclic structures may be either identical to or different from each other.

Specific examples of the hindered amine based compound include, but are not limited to, bis(1,2,2,6,6-pentamethyl-4-piperidyl) [[3,5-bis(1,1-dimethylethyl)-4-hydroxyphenyl]methyl]butylmalonate; a mixture of bis(1,2,2,6,6-pentamethyl-4-piperidyl) sebacate and methyl-1,2,2,6,6-pentamethyl-4-piperidyl sebacate; bis(2,2,6,6-tetramethyl-4-piperidyl) sebacate; N,N'-bis(2,2,6,6-tetramethyl-4-piperidyl)-N,N'-diformylhexamethylenediamine; polycondensates of dibutylamine, 1,3,5-triazine, and N,N'-bis(2,2,6,6-tetramethyl-4-piperidyl-1,6-hexamethylenediamine with N-(2,2,6,6-tetramethyl-4-piperidyl)butylamine; poly[{6-(1,1,3,3-tetramethylbutyl)amino-1,3,5-triazine-2,4-diyl} {(2,2,6,6-tetramethyl-4-piperidyl)imino}hexamethylene {(2,2,6,6-tetramethyl-4-piperidyl)imino}]; tetrakis(1,2,2,6,6-pentamethyl-4-piperidyl)butane-1,2,3,4-tetracarboxylate; tetrakis(2,2,6,6-tetramethyl-4-piperidyl)butane-1,2,3,4-tetracarboxylate; reactants of 1,2,2,6,6-pentamethyl-4-piperidiol and β,β,β',β'-tetramethyl-2,4,8,10-tetraoxaspiro[5.5]undecane-3,9-diethanol; reactants of 2,2,6,6-tetramethyl-4-piperidiol and β,β,β',β'-tetramethyl-2,4,8,10-tetraoxaspiro[5.5]undecane-3,9-diethanol; bis(1-undecanoxy-2,2,6,6-tetramethylpiperidine-4-il) carbonate; 1,2,2,6,6-pentamethyl-4-piperidyl methacrylate; 2,2,6,6-tetramethyl-4-piperidyl methacrylate, and so forth. Preferable examples include bis(1,2,2,6,6-pentamethyl-4-piperidyl) [[3,5-bis(1,1-dimethylethyl)-4-hydroxyphenyl]methyl]butylmalonate; polycondensates of dibutylamine, 1,3,5-triazine, and N,N'-bis(2,2,6,6-tetramethyl-4-piperidyl-1,6-hexamethylenediamine with N-(2,2,6,6-tetramethyl-4-piperidyl)butylamine; poly[{6-(1,1,3,3-tetramethylbutyl)amino-1,3,5-triazine-2,4-diyl} {(2,2,6,6-tetramethyl-4-piperidyl)imino}hexamethylene {(2,2,6,6-tetramethyl-4-piperidyl)imino}]; reactants of 1,2,2,6,6-pentamethyl-4-piperidiol and β,β,β',β'-tetramethyl-2,4,8,10-tetraoxaspiro[5.5]undecane-3,9-diethanol; and reactants of 2,2,6,6-tetramethyl-4-piperidiol and β,β,β',β'-tetramethyl-2,4,8,10-tetraoxaspiro[5.5]undecane-3,9-diethanol, which include three or more cyclic structures.

The following describes properties of the methacrylic resin composition according to the present embodiment.

<Weight Average Molecular Weight and Molecular Weight Distribution>

Similarly as the methacrylic resin according to the present embodiment, from a viewpoint of fluidity and mechanical strength, such as Charpy impact strength, the weight average molecular weight (Mw) of the methacrylic resin composition according to the present embodiment is preferably 65,000 to 300,000. From a viewpoint of maintaining mechanical strength, the weight average molecular weight is preferably 65,000 or more, more preferably 70,000 or more, even more preferably 80,000 or more, and further preferably 100,000 or more. Moreover, from a viewpoint of ensuring fluidity in molding processing, the weight average molecular weight is preferably 250,000 or less, more preferably 230,000 or less, even more preferably 220,000 or less, further preferably 200,000 or less, even further preferably 180,000 or less, and particularly preferably 170,000 or less.

The molecular weight distribution (weight average molecular weight (Mw)/number average molecular weight (Mn)) of the methacrylic resin composition is preferably 1.5 to 5 in view of the balance of fluidity, mechanical strength, and solvent resistance. The molecular weight distribution is more preferably 1.5 to 4.5, even more preferably 1.6 to 4, further preferably 1.6 to 3, and even further preferably 1.5 to 2.5.

The weight average molecular weight (Mw) and the number average molecular weight (Mn) can be measured with the method as described above with respect to the methacrylic resin.

<Proportion of Components within Specific Molecular Weight Ranges>

In the methacrylic resin composition according to the present embodiment, the content of components having a weight average molecular weight of 10,000 or less as measured by gel permeation chromatography (GPC) is preferably 0.1 mass % to 5.0 mass % from a viewpoint of improving processing fluidity, reducing poor external appearance of a molded article in molding (for example, silver marks referred to as silver streaks), and preventing adhesion to a roller in film production. A content of components having a weight average molecular weight of 10,000 or less within this range allow number of bubbles generated in the resin composition to be in a suitable range.

A content of 0.1 mass % or more enables improvement of processing fluidity. The lower limit for this content is preferably 0.2 mass % or more, more preferably 0.5 mass % or more, and even more preferably 0.6 mass % or more. A content of 5 mass % or less can reduce poor surface appearance (for example, by reducing silver streaks in molding), improve mold release in molding, inhibit adhesion to a roller in film production, and inhibit splitting when a film is held in stretching. The upper limit for this content is more preferably 4.0 mass % or less, even more preferably 3.0 mass % or less, and particularly preferably 2.0 mass % or less.

The content of components having a weight average molecular weight of 10,000 or less may be as described above with respect to the methacrylic resin.

In the methacrylic resin composition according to the present embodiment, the content of components having a weight average molecular weight of more than 10,000 and not more than 50,000 is preferably 10.0 mass % to 25.0 mass %.

A content of 10.0 mass % to 25.0 mass % can inhibit the formation of streaks in film molding processing and provides improvement in terms of preventing adhesion to a roller in film molding. From a viewpoint of imparting a good balance of processing properties such as processing fluidity, streak inhibition, and touch roller adhesion inhibition, the lower limit for this content is more preferably 12.0 mass % or more, and even more preferably 13.0 mass %, and the upper limit for this content is more preferably 24.0 mass % or less.

The content of components having a weight average molecular weight of more than 10,000 and not more than 50,000 may be as described above with respect to the methacrylic resin.

In the methacrylic resin composition according to the present embodiment, a ratio (b/a) of the content (b) of components having a weight average molecular weight of more than 50,000 relative to the content (a) of components having a weight average molecular weight of more than 10,000 and not more than 50,000 is preferably 2.5 to 8.5 from a viewpoint of obtaining a good balance of thermal stability and processability.

With regards to the ratio of high molecular weight components and low molecular weight components, due to the influence of viscosity difference between high molecular weight components and low molecular weight components in heated processing, a large ratio of low molecular weight components tends to provide excellent processing fluidity but increases roller adhesion in film processing, whereas a large ratio of high molecular weight components tends to facilitate formation of streaks in film processing.

In order to impart a good balance of the properties of both while providing improvement in terms of adhesion prevention, the ratio is preferably 3.0 or more, and more preferably 3.5 or more. On the other hand, in a case in which further improvement in terms of streaks in film processing is desirable, the ratio is preferably 8.0 or less, and more preferably 7.5 or less.

In the methacrylic resin composition according to the present embodiment, the total content of specific components including dimers, trimers, and the like that are any combination of the monomer (A), the monomer forming the structural unit (B), and the monomer (C) is preferably 0.01 mass % to 0.40 mass % from a viewpoint of preventing adhesion to a mold or roller in molding processing, and inhibiting foaming in film production. The upper limit is more preferably 0.35 mass % or less, further preferably 0.30 mass % or less, and particularly preferably 0.28 mass % or less from a viewpoint of the balance of external appearance and adhesion. When it necessary to consider deposited layer adhesion maintenance and fluidity during molding, the lower limit is preferably 0.02 mass % or more, even more preferably 0.1 mass % or more, further preferably 0.15 mass % or more, and particularly preferably 0.2 mass % or more.

When the total content of these specific components is within the range set forth above, adhesion to a mold or film roller in molding processing can be inhibited, and molding processability can be improved. However, a content of less than 0.01 mass % is not preferable because a complicated process is required to obtain such a content.

The total content of these components may be as described above with respect to the methacrylic resin.

In particular, the methacrylic resin composition according to the present embodiment is preferably a methacrylic resin composition comprising the methacrylic resin having a cyclic structure-containing main chain and another resin, wherein:

(1) weight average molecular weight as measured by gel permeation chromatography is 65,000 to 300,000; and (2) when the methacrylic resin composition is subjected to GC/MS measurement, components detected at a retention time of 22 minutes to 32 minutes have a total content 0.01 mass % to 0.40 mass % when the methacrylic resin is taken to be 100 mass %.

<Heat Resistance>

The glass transition temperature can be used as an indicator of heat resistance.

From a viewpoint of heat resistance in practical use of a component for HMD, the glass transition temperature of the methacrylic resin composition according to the present embodiment is 120° C. or higher, preferably 122° C. or higher, further preferably 123° C. or higher, even further preferably 124° C. or higher, and particularly preferably 125° C. or higher.

The glass transition temperature can be measured in accordance with ASTM D-3418. Specifically, the glass transition temperature can be measured by a method described in the subsequent EXAMPLES section.

<Thermal Stability>

When the methacrylic resin composition according to the present embodiment is used to mold a component for HMD, the resin may be held in a molten state inside a molding machine. Since the resin is held at high-temperature for a long time, the resin material is required to have a low tendency to thermally decompose (i.e., have thermal stability).

Moreover, in a case in which thickness-reduction of the component for HMD according to the present embodiment is necessary, high thermal stability is required since it is necessary to perform molding at high-temperature.

The weight loss ratio when held at a specific temperature for a specific time and the temperature at which a specific weight loss ratio is reached (thermal decomposition start temperature) can be used as indicators of thermal stability.

Specifically, in thermogravimetric analysis (TGA) of the methacrylic resin composition according to the present embodiment, the weight loss ratio of the methacrylic resin composition when held at approximately 290° C. for 30 minutes is preferably 5.0% or less, more preferably 4.0% or less, even more preferably 3.0% or less, and further preferably 2.0% or less.

The weight loss ratio of the methacrylic resin composition when held at 290° C. for 30 minutes can be measured by a method described in the subsequent EXAMPLES section.

The thermal decomposition start temperature (° C.) (temperature at time of 1% weight loss) of the methacrylic resin composition according to the present embodiment is preferably 290° C. or higher. The thermal decomposition start temperature is more preferably 300° C. or higher, even more preferably 310° C. or higher, further preferably 320° C. or higher, and even further preferably 325° C. or higher.

Note that the thermal decomposition start temperature may, for example, be taken to be the 1% weight loss temperature (thermal decomposition start temperature), which is the temperature at which the weight decreases by 1% upon heating, and the specific measurement method thereof may be a method described in the subsequent EXAMPLES section.

In the molding process of the component for HMD according to the present embodiment, to prevent thermal degradation and to obtain thermal stability that is excellent in practice, in the methacrylic resin included in the methacrylic resin composition for forming the component for HMD according to the present embodiment, it is effective to relatively reduce the amount of methacrylic acid ester monomer unit (A) to be copolymerized by increasing the ratio of the structural unit (B) having a cyclic structure-containing main chain. However, if the ratio of the structural unit (B) with respect to the monomer unit (A) is too high, the properties, such as molding fluidity and surface hardness, required as a film may not be obtained Therefore, it is necessary to define the ratio of the monomer unit (A) and the structural unit (B) in consideration of the balance among these properties.

Moreover, increasing the copolymer ratio of the structural unit (B) having a ring structure in its main chain is effective in terms of suppressing a degradation reaction caused by depolymerization when exposed to a high temperature. If the ratio of the structural unit (B) with respect to the methacrylic acid ester monomer unit (A) is increased, sufficient thermal stability can be imparted even if the amount of thermal stabilizer is reduced.

On the other hand, if the ratio of the methacrylic acid ester monomer unit (A) is relatively large, the amount of thermal degradation under a high-temperature environment increases. Here, in order to suppress thermal degradation, a thermal stabilizer can be added, but adding too much thermal stabilizer deteriorate heat resistance, and can also cause problems such as bleed out during molding.

As described above, in order to obtain desired thermal stability as a component for HMD, the methacrylic resin composition may include a heat stabilizer.

In the present embodiment, when the content of the heat stabilizer is Y (content (parts by mass) per 100 parts by mass of the methacrylic resin), the content of the methacrylic acid ester based monomer unit (A) is P, and the content of the structural unit (B) including a cyclic structure-containing main chain is Q (each being a content (mass %) per 100 parts by mass of the methacrylic resin), from a viewpoint of the balance among suppression of thermal degradation under a high temperature, molding processability, and heat resistance, the content Y (parts by mass) is preferably 0.053 xP/Q-0.4 or more, more preferably 0.053 xP/Q-0.35 or more, even more preferably 0.053 xP/Q-0.3 or more, further preferably 0.053 xP/Q-0.27 or more, and even further preferably 0.053 xP/Q-0.25 or more.

(Methacrylic Resin Composition Production Method)

The methacrylic resin composition according to the present embodiment can be prepared through melt-kneading of the methacrylic resin according to the present embodiment and an optionally added rubbery polymer, resin other than the methacrylic resin, and/or additives.

The method by which the methacrylic resin composition is produced may, for example, be a method of kneading using a kneading machine such as an extruder, a heating roller, a kneader, a roller mixer, or a Banbury mixer. Kneading by an extruder is preferable in terms of producibility. The kneading temperature may be set in accordance with the preferable processing temperature of the polymer forming the methacrylic resin and any other resins mixed therewith. As a guide, the kneading temperature may be within a range of 140° C. to 300° C., and preferably a range of 180° C. to 280° C. Moreover, it is preferable that the extruder includes a vent in order to reduce volatile content.

The acrylic thermoplastic resin obtained through solution polymerization is necessarily separated from the solvent and the residual monomer, except for a case in which the solution is directly used to obtain an optical isotropic protective film for polarizing film through solution casting. The separating method may be a commonly known method, such as devolatilization treatment heating the solvent so as to reduce the pressure and to volatilize the solvent and the residual monomer, and a method adding the solution into a poor solvent with respect to the resin so as to extract and remove the solvent and the residual monomer.

((Removal of Impurities))

The methacrylic resin composition according to the present embodiment is provided to a component for HMD for precise optical purpose, and thus preferably has less impurities mixed. Therefore, impurities may be removed as necessary.

Examples of the method for removing impurities include filtering with a leaf disc polymer filter, a pleat polymer filter, etc. with a filtration accuracy of 1.5 μm to 25 μm during kneading process and/or molding process performed with an extruder.

The filtration accuracy of the polymer filter is preferably 1.5 μm or more, more preferably 3 μm or more, even more preferably 5 μm or more, further preferably 10 μm or more, and particularly preferably 11 μm or more from a viewpoint of inhibiting mix of degradation products of the resin due to heat buildup in the extruder. Moreover, 25 μm or less is preferable, and 20 μm or less is more preferable from a viewpoint of removal efficiency of impurities.

[Component for HMD]

The component for HMD according to the present embodiment is a molded product that can be manufactured by melt-molding the aforementioned methacrylic resin composition, which is an optical component transmitting and/or separating light, characteristically polarized light.

The component for HMD according to the present embodiment can be suitably used as an optical lens in half mirror, polarization beam splitter, and so forth.

The following provides a detailed description of properties of the component for HMD according to the present embodiment.

<In-Plane Phase Difference Re>

The component for HMD according to the present embodiment has an in-plane directional phase difference (hereinafter referred to as "in-plane phase difference" as well) Re in absolute value of 30 nm or less. The in-plane directional phase difference Re is a value determined in terms of 3 mm thickness.

The absolute value of the in-plane directional phase difference Re is more preferably 20 nm or less, further preferably 15 nm or less, and particularly preferably 11 nm or less.

Generally, the absolute value of the in-plane directional phase difference Re is an indicator representing the degree of birefringence. The component for HMD according to the present embodiment has sufficiently small birefringence as compared to existing resins (for example, PMMA, PC, cyclic olefin resin, and so forth), and thus can be suitably used in a case in which a component for HMD is required of low birefringence or zero-birefringence.

On the other hand, a component for HMD having an in-plane directional phase difference Re in absolute value of more than 30 nm has high refractive index anisotropy, and cannot be used in a case in which a component for HMD is required of low birefringence or zero-birefringence.

<Thickness Directional Phase Difference Rth>

It is preferable that the component for HMD according to the present embodiment has a thickness directional phase difference Rth in absolute value of 30 nm or less. The thickness directional phase difference Rth is a value determined in terms of 3 mm thickness.

The absolute value of the thickness directional phase difference Rth is more preferably 30 nm or less, further preferably 25 nm or less, and particularly preferably 20 nm or less.

The thickness directional phase difference Rth is an indicator relating to, when used as an optical component, particularly a plate-like molded product, viewing angle of a display device to which the plate-like molded product is installed. Specifically, a smaller absolute value of the thickness directional phase difference Rth indicates better viewing angle properties, and smaller color tone change of the display color and smaller reduction of contrast depending on the angle of viewing.

The component for HMD according to the present embodiment has an thickness directional phase difference Rth with an extremely small absolute value as compared to a component for HMD including an existing resin (for example, PMMA, PC, triacetyl cellulose resin, cyclic olefin resin, and so forth).

<Photoelastic Coefficient>

The component for HMD according to the present embodiment preferably has a photoelastic coefficient ($C_R$) in a molded article molded into a film-like shape in absolute value of $3.0 \times 10^{-12}$ $Pa^{-1}$ or less, more preferably $2.0 \times 10^{-12}$ $Pa^{-1}$ or less, further preferably $1.0 \times 10^{-12}$ $Pa^{-1}$ or less.

The photoelastic coefficient ($C_R$) in this disclosure is a physical coefficient represented by $R=(C) \times \sigma$, and is a unique value of each transparent matter, where R is a phase difference observed when a polarized light is irradiated on an object of which the degree and the direction of a strain S changes in response to an external force $\sigma$.

The photoelastic coefficient is described in various documents (see, for example, Review of Chemistry, No. 39, 1998 (published by Publishing Center of the Chemical Society of Japan)), and can be defined by the following formulae (i-a) and (i-b). A value of the photoelastic coefficient ($C_R$) closer to zero indicates smaller birefringence change in response to external force.

$$C_R = |n|\sigma_R \quad \text{(i-a)}$$

$$|\Delta n| = nx - ny \quad \text{(i-b)}$$

(In the formula, $C_R$ is the photoelastic coefficient; $\sigma_R$ is the tensile stress; $|\Delta n|$ is the absolute value of the birefringence; nx is the refractive index in the tensile direction; and ny is the refractive index in a direction in the plane orthogonal to the tensile direction.)

An absolute value of the photoelastic coefficient ($C_R$) in the range set forth above is sufficiently small as compared to existing resins (for example, PMMA, PC, cyclic olefin resin, and so forth). Therefore, (photoelastic) birefringence in response to external force is not generated, and birefringence change is unlikely to occur. Moreover, since (photoelastic) birefringence in response to residual stress is unlikely to occur, birefringence distribution in the molded product is small as well.

Then, the component for HMD according to the present embodiment preferably includes a methacrylic resin composition having a photoelastic coefficient ($C_R$) in absolute value of $3.0 \times 10^{-12}$ $Pa^{-1}$ or less, more preferably $2.0 \times 10^{-12}$ $Pa^{-1}$ or less, even more preferably $1.0 \times 10^{-12}$ $Pa^{-1}$ or less. If the absolute value of the photoelastic coefficient is in the range as set forth above, irregularities in polarized light in response to external stress due to a linear expansion difference, etc. between the component for HMD and a casing supporting the same is unlikely to occur.

The following provides detailed description of the birefringence Δn and the draw ratio S.

In a case in which the methacryl resin composition according to the present embodiment is shaped on a film into a uniaxially stretched film and is subjected to property evaluation, in the least square approximate straight line relation (ii-a) of the birefringence Δn(S) and the draw ratio S, the slope K preferably satisfies the following formula (ii-b).

$$\Delta n(S) = K \times S + C \quad \text{(ii-a)}$$

$$|K| \leq 0.30 \times 10^{-5} \quad \text{(ii-b)}$$

(In the formula, Δn(S) is the birefringence, and S is the draw ratio, where the birefringence Δn(S) is a value determined by converting the value measured as a film (the value obtained according to the aforementioned formula (i-b)) in terms of 3 mm thickness; and C is a constant indicating the birefringence without stretching.)

An absolute value (|K|) of the slope K is more preferably $0.15 \times 10^{-5}$ or less, further preferably $0.10 \times 10^{-5}$ or less.

Here, the value of K is a value when performing uniaxial stretching at a stretching temperature of (Tg+20)° C. and a stretching rate of 500 mm/min, where Tg is a glass-transition temperature measured through DSC measurement of the film.

It is generally known that a smaller stretching rate indicates a smaller increase of the birefringence. The value of K can be calculated by, for example, respectively measuring each value of the birefringence (Δn(S)) exhibited by uniaxially stretched films obtained when setting the draw ratio (S) to 100%, 200% and 300%, and plotting these values with respect to the draw ratio and performing least squares approximation. Moreover, the draw ratio (S) is a value represented by the following formula, where the distance between chucks before stretching is $L_0$, and the distance between chucks after stretching is $L_1$.

$$S = \{(L_1 - L_0)/L_0\} \times 100(\%)$$

A film-like or sheet-like molded product is occasionally subjected to stretch processing for the purpose of higher mechanical strength. In the aforementioned relation, the value of the slope K represents the degree of change of the birefringence (Δn(S)) relative to the draw ratio(S). A larger value of K indicates a larger change of the birefringence with respect to the stretching, and a smaller value of K indicates a smaller change of the birefringence with respect to the stretching.

A film including the methacryl resin composition according to the present embodiment has a sufficiently small value of the slope K as compared to existing resins (for example, PMMA, PC, cyclic olefin resin, and so forth). Therefore, the birefringence of existing resins increases in response to stretch orientation in stretch processing or residual molding strain in injection molding, while the birefringence of the methacryl resin composition according to the present embodiment is unlikely to increase.

As described above, it is understood that a component for HMD including the methacrylic resin composition according to the present embodiment sufficiently small (approximately zero) in-plane phase difference Re, thickness directional phase difference Rth and photoelastic coefficient C as compared to an optical component for HMD including existing resins.

<Heat Resistance>

The component for HMD according to the present embodiment includes a methacrylic resin composition having a glass-transition temperature of 120° C. or higher, and thus can be arranged in the vicinity of an LED light source used in recent optical projection devices. Moreover, the component for HMD according to the present embodiment includes the aforementioned methacrylic resin composition having thermal stability, and thus can be suitably provided for use when high temperature durability is required.

<Durability>

The component for HMD of this disclosure preferably has excellent durability in environment of use. Color change after being left standing for a long period under high temperature and high humidity conditions can be used as an indicator of the durability in environment of use. Specifically, the durability in environment of use can be evaluated through a variation ΔYI of YI after being left standing for 500 hours under the conditions of temperature: 85° C., humidity: 85%. A smaller variation ΔYI of YI after being left standing for 500 hours under the conditions of temperature: 85° C., humidity: 85% indicates better durability. The ΔYI is preferably 4 or less, more preferably 3 or less, further preferably 2 or less. A value of the ΔYI of no more than the upper limit ensures sufficient durability in environment of use.

Note that the value of YI can be measured according to JIS K7105 by using, for example, a molded piece having a thickness of 1 mm to 3 mm.

<Surface Hardness>

The component for HMD of this disclosure preferably have a surface hardness of 3H or higher in terms of pencil hardness. A pencil hardness of 3H or higher ensures sufficient scratch properties when used as a component for HMD. 4H or higher more preferable. On the other hand, the upper limit of pencil hardness is approximately 6H.

<Optical Path Length>

The optical path length of the component for HMD of this disclosure is preferably 10 μm to 100,000 μm, more preferably 25 μm to 10,000 μm, particularly preferably 50 μm to 5,000 μm. A component for HMD having an optical path length of 10 μm or more can be easily handled as a molded product. Moreover, an optical path length of 100,000 μm or less ensures sufficient transparency.

<Transparency>

Total light transmittance can be used as an indicator of the transparency.

The total light transmittance of the component for HMD according to the present embodiment can be appropriately optimized depending on the purpose. When used in a situation where the transparency is required, from a viewpoint of visibility, a total light transmittance in terms of 3 mm thickness is preferably 80% or more. 85% or more is more preferable, 88% or more is even more preferable, and 90% or more is particularly preferable.

Although a higher total light transmittance is preferable, in actual use, 94% or less is sufficient for ensuring the visibility.

The total light transmittance can be measured by, for example, a method according to JIS K7105.

<Molding Processability>

The molding processability can be evaluated through, for example, unlikeliness to adhere to the mold during molding processing.

<External Appearance>

External appearance can be evaluated, for example, the presence of bubbles, the presence of streaks, the presence of silver streaks, and so forth.

[Molding of Component for HMD]

The methacrylic resin composition according to the present embodiment can be processed into a component for HMD through melt molding. The method for performing melt molding can be, for example, melt thermal pressing, injection molding, and so forth. From a viewpoint of productivity, injection molding is preferable. Moreover, the method can be: continuously extruding a plate-like product through melt extrusion, and then shaping a prism-like shape on the surface through melt thermal pressing.

Such surface shaping may be either a regular periodic structure or an irregular structure. In a case of regular periodic structure, each period of the periodic structure is preferably 10 μm to 500 μm. A period of 10 μm or more can control the light as a ray.

A molded product obtained through such melt molding can be directly used as a component for HMD, or used as a component for HMD after the processing described in the following.

[After Processing of Component for HMD]

The component for HMD according to the present embodiment may be subjected to dielectric deposition treatment, antireflection treatment, metal deposition treatment, hard coating treatment, anchor coating treatment, and transparent conductivity treatment as necessary.

Each treatment can be performed by, for example, depositing an inorganic compound or a metallic compound, so as to dispose an inorganic layer or metal deposited layer on the surface of the molded product according to the present embodiment.

The inorganic layer is preferably a multilayer transparent dielectric film.

[[Formation of Multilayer Transparent Dielectric Film]]

The surface of the component for HMD according to the present embodiment may be provided with a multilayer transparent dielectric film by depositing an inorganic compound such as silicon dioxide ($SiO_2$), titanium dioxide ($TiO_2$) and so forth in a monolayer-multilayer manner. The multilayer transparent dielectric film may be a multilayer film having a hybrid structure of chrome layer and silicon dioxide layer as necessary.

The method for forming the multilayer transparent dielectric film may be conventionally known technique such as vacuum deposition, sputtering, ion plating and so forth. From a viewpoint of film uniformity and film adhesion to anchor coating layer, the film is preferably formed by sputtering.

The necessary number of layers depends on the purpose, and may be one layer to a thousand layers. For the purpose of efficient polarization, twenty layers or more is preferable. The incident surface and the exit surface are preferably subjected to antireflection treatment. When performing such various surface treatment, treatment through corona discharge or plasma discharge, or surface treatment applying a primer agent having epoxy group, isocyanate group, etc. can be performed as necessary, so as to enhance adhesion to the multilayer transparent dielectric film.

[[Formation of Metal Deposited Layer]]

Moreover, on the surface of the component for HMD according to the present embodiment, a metal deposited layer (referred to as "metallic film" as well in the present Specification) may be formed as necessary by depositing a metallic compound such as zinc oxide, indium tin oxide and so forth in a monolayer-multilayer manner.

Similarly as formation of the multilayer transparent dielectric film, the method for forming the metal deposited layer may be conventionally known technique such as vacuum deposition, sputtering, ion plating and so forth.

The thickness of the metal deposited layer is not specifically limited, and may be appropriately selected depending on the purpose in a range of 5 nm to 1,000 nm.

The number of metal deposited layers is not specifically limited, and may be appropriately selected depending on the purpose. Moreover, similarly as formation of the multilayer transparent dielectric film, treatment through corona discharge or plasma discharge, or surface treatment applying a primer agent having epoxy group, isocyanate group, etc. can be performed as necessary, so as to enhance adhesion to the metal deposited layer.

Note that in this disclosure, a molded product having on its surface the aforementioned inorganic layer (multilayer transparent dielectric film or metal deposited layer (for example, aluminum, tin, silver, and so forth) is referred to as "laminate" as well.

[Lens as Component for HMD]

Examples of the lens according to the present embodiment include convex lens, Fresnel lens, aspherical lens, inner lens, gradient index lens, the micro lens array as described in WO2013175549A1, and so forth.

The thickness of the lens according to the present embodiment is not specifically limited, and may be appropriately selected, for example, in a range of the aforementioned range of optical path length of 10 μm to 100,000 μm.

The lens according to the present embodiment can be manufactured according to a commonly known manufacture method except that the aforementioned thermoplastic resin composition is used as a material.

[Half Mirror]

The half mirror according to the present embodiment includes the aforementioned laminate, and can be used as a component constituting a head mount display.

The laminate included in the half mirror according to the present embodiment may be one having a multilayer transparent dielectric film or metallic film appropriately selected depending on the purpose of the half mirror.

Moreover, the thickness of the half mirror according to the present embodiment may be appropriately selected depending on the purpose in a range of the optical path length of 10 μm to 100,000 μm.

The method for manufacturing the half mirror according to the present embodiment may be a commonly known manufacture method, except that the aforementioned laminate is included.

The half mirror according to the present embodiment includes the aforementioned laminate of this disclosure, and thus has high optical isotropy (low birefringence), and excellent heat resistance, color tone, surface hardness, durability in environment of use, and inorganic adhesion.

[Polarization Beam Splitter]

The polarization beam splitter according to the present embodiment includes the aforementioned laminate, and can be used as a component constituting a head mount display.

Examples of the polarization beam splitter according to the present embodiment include prism type, flat type, wedge substrate type and so forth, among which prism type is particularly suitable. A prism type polarization beam splitter includes two prisms, in which a multilayer transparent dielectric film or a metallic film is formed on overlaying surfaces of the two prisms contacting each other. Namely, the aforementioned laminate may be used as a prism having a multilayer transparent dielectric film or a metallic film.

The size of the polarization beam splitter according to the present embodiment is not specifically limited, as long as the optical path length is in the range of 10 μm to 100,000 μm.

The method for manufacturing the polarization beam splitter according to the present embodiment may be a commonly known manufacture method, except that the aforementioned laminate is included.

The polarization beam splitter according to the present embodiment includes the aforementioned laminate of this disclosure, and thus has high optical isotropy (low birefringence), and excellent heat resistance, color tone, surface hardness, durability in environment of use, and inorganic adhesion.

A preferable embodiment of this disclosure has been described above, while this disclosure is not limited to the aforementioned embodiment.

EXAMPLES

Hereinafter, the content of this disclosure is described more specifically by exemplifying with examples and comparative examples. This disclosure is not limited to these examples.

[Formulation Analysis of Acrylic Thermoplastic Resin]

The acrylic thermoplastic resin obtained via polymerization was dissolved in $CDCl_3$, and was subjected to $^1$H-NMR and $^{13}$C-NMR measurement (measurement temperature: 40° C.) by using a DPX-400 device produced by Bruker, so as to respectively identify the amounts of: (i) the first structural unit, (ii) the second structural unit, (iii) the third structural unit, and (iv) the fourth structural unit, and to certify the formulation from the ratio of the structural units.

[Glass-Transition Temperature Measurement of Acrylic Thermoplastic Resin]

A DSC curve was obtained by heating approximately 10 mg of a sample from normal temperature to 200° C. at a heating rate 10° C./min by using a differential scanning calorimeter (Diamond DSC produced by PerkinElmer Co., Ltd.) under a nitrogen gas atmosphere, with α-alumina as a reference according to JIS-K-7121, and the glass-transition temperature (Tg) of the acrylic thermoplastic resin obtained through polymerization was calculated from the DSC curve by midpoint method.

[Weight-Average Molecular Weight Measurement of Acrylic Thermoplastic Resin]

(I. Measurement of Methacrylic Resin Weight Average Molecular Weight)

The weight average molecular weight (Mw) of methacrylic resins produced in the subsequently described production examples was measured with the following device and conditions.

Measurement device: Gel permeation chromatograph (HLC-8320GPC) produced by Tosoh Corporation Measurement conditions Column: TSK guard column Super H-H×1, TSK gel Super HM-M×2, TSK gel Super H2500×1; connected in series in this order. In this column, elution was fast for high molecular weights and slow for low molecular weights.

Developing solvent: tetrahydrofuran; flow rate: 0.6 mL/min; 0.1 g/L of 2,6-di-t-butyl-4-methylphenol (BHT) added as internal standard Detector: Refractive index (RI) detector Detection sensitivity: 3.0 mV/min Column temperature: 40° C.

Sample: Solution of 0.02 g of methacrylic resin in 20 mL of tetrahydrofuran

Injection volume: 10 μL Standard samples for calibration curve: Following 10 types of polymethyl methacrylate (PMMA Calibration Kit M-M-10 produced by Polymer Laboratories Ltd.) of differing molecular weight, each having a known monodisperse weight peak molecular weight Since each poly(methyl methacrylate) used in the standard samples for calibration curve had single peak, the peaks corresponding to each were respectively expressed as weight peak molecular weight Mp. This weight peak molecular weight is different from a peak top molecular weight calculated in a case where each sample has a plurality of peaks.

Weight peak molecular weight (Mp)

Standard sample 1: 1,916,000
Standard sample 2: 625,500
Standard sample 3: 298,900
Standard sample 4: 138,600
Standard sample 5: 60,150
Standard sample 6: 27,600
Standard sample 7: 10,290
Standard sample 8: 5,000
Standard sample 9: 2,810
Standard sample 10: 850

The RI detection intensity relative to the elution time of the methacrylic resin was measured under the conditions shown above.

The weight-average molecular weight (Mw), the number-average molecular weight (Mn) and the molecular weight distribution (Mw/Mn) of the methacrylic resin were determined based on the area in the GPC elution curve and a cubic approximation of the calibration curve.

(II. Measurement of Total Amount of Specific Components)

Each methacrylic resin (specifically, soluble content in reprecipitation) produced in the subsequently described examples was subjected to GC/MS measurement with the following device and conditions, and using octadecyl 3-(3,5-di-tert-butyl-4-hydroxyphenyl)propionate as an internal standard substance, and the total amount of components including dimers and trimers of monomers and the like (hereinafter referred to simply as "specific components" in EXAMPLES section and Tables) was calculated.

First, a standard solution was prepared according to the following procedure. Octadecyl 3-(3,5-di-tert-butyl-4-hydroxyphenyl)propionate in an amount of 25.0 mg was placed in a volumetric flask having a capacity of 100 mL. The volumetric flask was filled with chloroform up to the calibration line thereof to prepare a 0.025 mass % octadecyl 3-(3,5-di-tert-butyl-4-hydroxyphenyl)propionate standard solution.

Next, a GC/MS measurement solution was prepared according to the following procedure. A resin sample of approximately 0.5 g was dissolved in 10 mL of chloroform, and then reprecipitation from 60 mL of methanol was performed. The insoluble content was removed by filtration and the chloroform/methanol soluble content was heated to dryness at 60° C. for 90 minutes under nitrogen blowing. Next, 1 mL of the standard solution was added to the concentrated soluble content and the soluble content was dissolved therein to obtain a GC/MS measurement solution.

GC/MS measurement was then carried out with the following device and conditions using 1 μL of the GC/MS measurement solution.

It was confirmed in advance by separate GC/MS measurement that peaks for dimers and trimers of the used monomers are observed at a retention time of 22 minutes to 32 minutes with the device and conditions shown below. Based on this, a total area value of peaks observed between a retention time of 22 minutes and 32 minutes in GC/MS measurement of the GC/MS measurement solution was attributed to components including dimers and trimers of the used monomers and the like. In this manner, the total amount of specific components contained in the GC/MS measurement solution was calculated.

Note that in a situation in which a peak due to an additive, such as a thermal stabilizer, appeared in the retention time range mentioned above, calculation of the total amount of specific components was performed by subtracting an area value of the peak attributed to the additive from the total area value.

Measurement device

Produced by Agilent Technologies, GC/MS GC-7890A, MSD-5975C

Measurement conditions

Column: HP-5MS (length 30 m, internal diameter 0.25 mm, film thickness 0.25 μm)

Carrier gas: Helium (1 mL/min)
Detector: MSD
Ionization method: EI
Oven temperature: Held at 50° C. for 5 minutes, increased to 325° C. at 10° C./min, and held at 325° C. for 10 minutes
Injection port temperature: 325° C.
Transfer temperature: 325° C.
Mass spectrum range: 20 to 800
Split ratio: 10:1
Injection volume: 1 μL
Internal standard substance: Octadecyl 3-(3,5-di-tert-butyl-4-hydroxyphenyl)propionate Data from the GC/MS measurement was processed according to the following procedure.

A peak area value detected for octadecyl 3-(3,5-di-tert-butyl-4-hydroxyphenyl)propionate was calculated and was then compared with a total area value of peaks detected in the component detection region for the resin sample to approximate the total amount [mg] of components. The calculation formula is shown below.

> Total amount of components [mg]=(Octadecyl 3-(3,
> 5-di-tert-butyl-4-hydroxyphenyl)propionate
> additive amount 0.25 [mg])×(Component peak
> total area value)/(Octadecyl 3-(3,5-di-tert-butyl-
> 4-hydroxyphenyl)propionate peak area value)

This total amount of components was divided by the amount of the resin sample after reprecipitation treatment to calculate the total content (mass %) of components.

Note that in a GC/MS total ion chromatogram, the base line may gradually rise with increasing oven temperature. In the case of locations where the inclination of the base line was large, integration was performed divided into a number of times in consideration of the inclination of the base line to accurately calculate a peak area value, and these integrated values were summed to obtain the "component peak total area value".

[Optical Property Evaluation]
<Preparation of Sample for Optical Evaluation>

The acrylic thermoplastic resin obtained through polymerization was processed into a film through melt vacuum pressing. A Kapton sheet was arranged above an iron plate, a thickness of 150-μm thick metal frame with a 15-cm square hollowed out was placed thereabove, and the acrylic thermoplastic resin was placed there. Further, a Kapton sheet was overlapped, and an iron plate was arranged. The sample was sandwiched with two golden plates, and placed in a vacuum compression molding machine (SFV-30 produced by Shinto Metal Industries Corporation). In a phase in which depression was initiated until the pressure became 10 KPa, the sample was heated for 20 minutes to 260° C., held at 260° C. for 5 minutes, and then compressed for 5 minutes at a pressure of 10 MPa. Next, in a phase in which cooling was initiated until the temperature became 50° C., after recovering to atmospheric pressure in a vacuum drier, the sample was taken out. Then, the sample was peeled from the Kapton sheets, then sandwiched by new Kapton sheets, filled with nitrogen, and held for 8 hours in a drier maintained at a temperature 10° C. higher than the glass-transition temperature (Tg).

Optical properties of the component for HMD were evaluated by using the obtained film, the following method.

<Measurement of Photoelastic Coefficient>

A birefringence measurement device that is described in detail in Polymer Engineering and Science 1999, 39, 2349-2357 was used. A film (film thickness ca.150 μm; film width ca.6 mm) including an acrylic thermoplastic resin that was cured for at least 24 hours in a constant temperature and constant humidity chamber adjusted to a temperature of 23° C. and a humidity of 60% was used, and was set in a film tensing device (produced by Imoto Machinery Co., Ltd.) set up in the same constant temperature and constant humidity chamber such that the chuck separation was 50 mm. Next, a birefringence measurement device described below (RETS-100 produced by Otsuka Electronics Co., Ltd.) was set up such that a laser light path of the device was positioned in a central portion of the film. The birefringence was measured while applying tensile stress with a strain rate of 50%/min (chuck separation: 50 mm, chuck movement speed: 5 mm/min). The photoelastic coefficient ($C_R$) and its absolute value ($|C_R|$) were calculated by making a least squares approximation of the relationship between the absolute value ($|\Delta n|$) of the measured birefringence and the tensile stress ($C_R$) and then determining the gradient of the resultant straight line. This calculation was performed using data in a tensile stress range of 2.5 MPa≤$\sigma_R$≤10 MPa.

$$C_R = |n|/\sigma_R$$

$$|\Delta n| = |nx-ny|$$

($C_R$: photoelastic coefficient, $\sigma_R$: tensile stress, $|\Delta n|$: absolute value of birefringence, nx: refractive index of tension direction; ny: refractive index of in-plane direction perpendicular to tension direction)

<Measurement of Birefringence>

The birefringence of a polarization light transmitting optical component was measured by rotating-analyzer method, by using RETS-100 produced by Otsuka Electronics Co., Ltd. The value of the birefringence is in terms of a light having a wavelength of 550 nm. The birefringence (Δn) was calculated according to the following formula. By converting the obtained value in terms of a thickness of the polarization light transmitting optical component of 3 mm, a value was obtained as a measurement value.

$$\Delta n = nx-ny$$

(Δn: birefringence, nx: refractive index of tension direction, ny: refractive index of in-plane direction perpendicular to tension direction)

The absolute value (|n|) of the birefringence (Δn) was obtained as follows.

$$|\Delta n| = |nx-ny|$$

<Measurement of In-Plane Phase Difference Re>

Birefringence measurement of the polarization light transmitting optical component was performed by rotating-analyzer method at a wavelength of 400 nm to 800 nm, by using RETS-100 produced by Otsuka Electronics Co., Ltd. set in a constant temperature and constant humidity chamber adjusted to a temperature of 23° C. and a humidity of 60%. By performing in-plane phase difference Re measurement at the sample central portions of thirty 4-cm square films, and performing measurement of the thickness of the sample central portion, the in-plane directional phase difference Re in terms of 3 mm thickness was obtained. Next, by converting to an absolute value, averaging, and converting the result in terms of the total thickness obtained above, the absolute value of the in-plane phase difference Re of the polarization light transmitting optical component was obtained.

Conversion from each thickness to a thickness of 3 mm was performed based on the following formula.

The absolute value ($|\Delta n|$) of the birefringence and the phase difference Re have the following relation.

$$Re = |\Delta n| \times d$$

(|Δn|: absolute value of birefringence, Re: phase difference, d: sample thickness)

The absolute value (|Δn|) of the birefringence is a value indicated as follows.

$$|\Delta n| = |nx - ny|$$

(nx: refractive index of tension direction; ny: refractive index of in-plane direction perpendicular to tension direction)

<Measurement of Thickness Directional Phase Difference Rth>

Birefringence measurement of the polarization light transmitting optical component was performed at a wavelength of 589 nm, by using a phase difference measurement device produced by Oji Scientific Instruments (KOBRA-21ADH) set in a constant temperature and constant humidity chamber adjusted to a temperature of 23° C. and a humidity of 60%. By performing measurement of the thickness directional phase difference Rth at the sample central portions of thirty 4-cm square films, and then performing measurement of the thickness of the sample central portion, the thickness directional phase difference Rth in terms of 3 mm thickness was obtained. Next, by converting to an absolute value, averaging, and converting the result in terms of the total thickness obtained above, the absolute value of the thickness directional phase difference Rth of the polarization light transmitting optical component was obtained.

Conversion from each thickness to a thickness of 3 mm was performed based on the following formula. The absolute value (|Δn|) of the birefringence and the phase difference Rth have the following relation.

$$Rth = |\Delta n| \times d$$

(|Δn|: absolute value of birefringence, Rth: phase difference, d: sample thickness)

The absolute value (|Δn|) of the birefringence is a value indicated as follows.

$$|\Delta n| = |(nx + ny)/2 - nz|$$

(nx: refractive index of tension direction; ny: refractive index of in-plane direction perpendicular to tension direction, nz: thickness directional refractive index of out-of-plane direction perpendicular to tension direction)

In a stretched sample completely satisfying optical isotropy, both the in-plane phase difference Re and the thickness directional phase difference Rth are zero, without occurrence of unevenness of phase difference.

<Measurement of Slope K in Relation of Birefringence>

An acrylic thermoplastic resin film (thickness: approximately 150 μm, width: 40 mm) was shaped through uniaxial free stretching by using a 10 t tension testing machine produced by Instron at stretching temperature of (Tg+20)° C. and a stretching rate of 500 mm/min. Stretching was performed at draw ratios of 100%, 200% and 300%. Then, the birefringence of each obtained stretched sample was measured according to the method described above, so as to obtain the birefringence exhibited in uniaxial stretching (Δn(S)).

The value of the slope K was obtained through a least square approximate straight line relation (A) obtained by plotting the obtained value of the birefringence (Δn(S)) exhibited by each stretched sample with respect to its draw ratio (S). A smaller value of the slope K indicates smaller change of the birefringence (Δn(S)).

Δn(S)=K×S+C(C is a constant: the birefringence value without stretching)  (A)

The birefringence is a value determined in terms of 3 mm thickness.

Moreover, the draw ratio (S) is a value represented by the following formula, where the distance between chucks before stretching is $L_0$, and the distance between chucks after stretching is $L_1$.

$$S = \frac{L_1 - L_0}{L_0} \times 100 \, (\%)$$

[Manufacture of Polarization Light Transmitting Optical Component] [[Melt Thermal Molding]]

The resin or resin composition as a raw material was previously dried at 80° C. for 6 hours. A prism-like mold having a shape of a right triangle having two short edges of 40 mm and a depth of 40 mm was used to perform injection molding of the resin or resin composition under the injection molding conditions of cylinder temperature: 265° C., injection rate: 20 mm/sec, injection pressure: 110 MPa, and mold temperature: 115° C., so as to obtain a prism-like molded product.

[[Method for Applying Multilayer Transparent Dielectric Layer]]

The inclined surface of the prism-like molded product obtained through injection molding was subjected to corona discharge treatment was performed at an energy of 50 W·min/m² in the atmosphere, subjected to hydrophilic treatment, and then placed into a sputtering device, so as to form a multilayer transparent dielectric layer on the surface by using $SiO_2$ target with argon gas and oxygen gas flowing in.

[Method for Manufacturing Polarization Beam Splitter]

The inclined surfaces having multilayer transparent dielectric layers of two of the prisms obtained as described above were adhered to each other to avoid air from entering therein, so as to manufacture a Kubrick type polarization beam splitter.

[Polarized Light Leakage of Polarization Beam Splitter]

The light of an LED light source was converted to parallel rays by using a collimator lens, and then passed through a flywheel lens so as to be converted to 10 mm square white light. Then, the manufactured Kubrick type beam splitter was set on an XY stage, and a polarizer was placed at a position for quenching the transmitted polarized light. Then, the XY stage was moved, and polarized light leakage at nine points was evaluated via observation.

Those without change of polarized light leakage during movement of the XY stage were evaluated as excellent, those with slight partial light-dark change observed were evaluated as fair, and those with clear polarized leakage were evaluated as poor.

[Surface Hardness Measurement]

The pencil hardness of the polarization light transmitting optical component was measured according to JIS K5600-5-4 with a load of 500 g, by using an electric system pencil scratch hardness tester (produced by Yasuda Seiki Seisakusho, Ltd.) to the orthogonal surfaces of the product of injection molding.

[Variation of YI]

Measured according to JIS K7105. The product of injection molding was measured of the value of YI again after being left standing for 500 hours under the conditions of temperature: 85° C., humidity: 85%, so as to obtain the variation of YI (ΔYI). A smaller value of the variation of YI (ΔYI) indicates better resistance in environment of use of the component for HMD.

[Adhesion Measurement of Multilayer Transparent Dielectric Layer]

The adhesion of the multilayer transparent dielectric layer was evaluated by cross-cut method according to JIS-K5600-5-6. The evaluation criteria was as follows.

0: Smooth cut bottom and no peeling of the lattice plane.
1: Slight peeling at the cut crossing point.
2: Peeling along the cut bottom and at the crossing point, affecting approximately 5% to 15% of the total area.
3: Peeling of approximately 15% to 35% in the cross cut portion.
4: Partial complete peeling, and peeling of approximately 35% or less in the cross cut portion.
5: More peeling than ranking 4.

[Display Quality Evaluation of Optical Projection Device]

Figure 2:
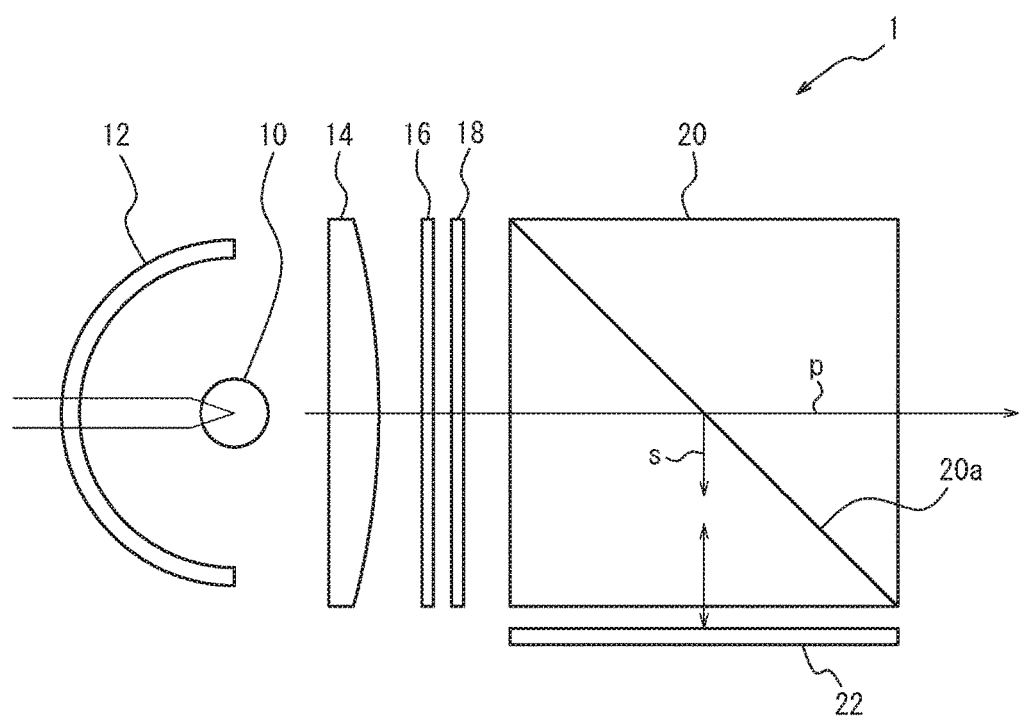
FIG. 2 schematically illustrates constitution of an optical projection device used in Examples for evaluating a polarization beam splitter according to one embodiment of this disclosure.

Optical projection devices having the structure as illustrated in FIG. 2 were manufactured. Those having excellent color reproducibility and image resolution of the projected image were evaluated as excellent, those having excellent color reproducibility were evaluated as good, and those having color change and poor image resolution were evaluated as poor.

Example 1

445 kg of methyl methacrylate (MMA), 44 kg of N-phenyl maleimide (PMI), 61 kg of N-cyclohexyl maleimide (CMI), 450.0 kg of methaxylene, and 100 part ppm of n-octyl mercaptane per 100 parts by mass of a total amount of all monomers were added into a mixing device equipped with pitched-paddle blades, a temperature sensor, a condenser, and a 1.25 m$^3$ reaction tank equipped with a nitrogen introducing pipe, and were dissolved so as to prepared a raw material solution. The raw material solution was mixed and simultaneously heated to 125° C. with nitrogen passing in.

On the other hand, 0.23 kg of Perhexa C-75 and 1.82 kg of methxylene were mixed, so as to prepare an initiator feed solution.

After the raw material solution reached 127° C., feed (addition) of the initiator feed solution (polymerization initiator solution) was initiated according to the profiles (1) to (6).

(1) 0.0 to 0.5 hours: feed rate: 1.00 kg/hour
(2) 0.5 to 1.0 hours: feed rate: 0.50 kg/hour
(3) 1.0 to 2.0 hours: feed rate: 0.42 kg/hour
(4) 2.0 to 3.0 hours: feed rate: 0.35 kg/hour
(5) 3.0 to 4.0 hours: feed rate: 0.14 kg/hour
(6) 4.0 to 7.0 hours: feed rate: 0.13 kg/hour After the initiator had been fed for 7 hours (time B=7 hours), the reaction was proceeded for 1 hour, and polymerization reaction was performed until 8 hours after initiation of initiator addition.

During the polymerization reaction, the internal temperature was controlled at 127±2° C. According to measurement of polymerization conversion rate of the obtained polymerization solution, MMA units were 94.2 mass %, PMI units were 95.9 mass %, and CMI units were 91.8 mass %. The polymerization conversion rate in total was 94%.

The polymerization solution obtained in the above was subjected to devolatilization treatment at 140 rpm and 10 kg/hour in terms of resin amount by using a ϕ42 mm devolatilizing extruder with a fore bent number of 4 and a back bent number of 1, so as to obtain a resin pellet.

The obtained pellet had a weight-average molecular weight of 180,000, and a glass-transition temperature of 135° C.

Moreover, the formation thereof obtained through NMR was MMA units: 81 mass %, PMI units: 8 mass %, CMI units: 11 mass %. The content of the specific components was 0.26 mass %. Moreover, the absolute value $|C_R|$ of the photoelastic coefficient was $0.4 \times 10^{-12}$ Pa$^{-1}$ (the photoelastic coefficient was $+0.4 \times 10^{-12}$ Pa$^{-1}$). In terms of 3 mm thickness, Re was 9 nm, and Rth was 26 nm. The slope K was $0.03 \times 10^{-5}$.

The manufacture method in Example 1 satisfied the conditions (i) to (v) in the aforementioned manufacture method.

Injection molding was performed so as to manufacture a polarization beam splitter. The pencil hardness was 4H, the result of polarized light leakage testing was excellent, and the result of adhesion testing was 2. The variation of YI was 2 or less.

Example 2

A pellet-like acrylic thermoplastic resin was obtained similarly as the polymerization of Example 1, except that used were 28 kg of styrene (St), 385 kg of methyl methacrylate (MMA), 28 kg of N-phenyl maleimide (PMI), 110 kg of N-cyclohexyl maleimide (CMI), and 450.0 kg of methaxylene.

Formulation of this acrylic thermoplastic resin was certified, and structural units derived from each monomer of MMA, PMI, CMI and St were respectively 70 mass %, 5 mass %, 20 mass % and 5 mass %. The content of the specific components was 0.21 mass %. Moreover, the glass-transition temperature was measured as 141° C., and the weight-average molecular weight was 140,000. The absolute value $|C_R|$ of the photoelastic coefficient was $0.1 \times 10^{-12}$ Pa$^{-1}$ (the photoelastic coefficient was $+0.1 \times 10^{-12}$ Pa$^{-1}$) In terms of 3 mm thickness, Re was 24 nm, and Rth was 16 nm. The slope K was $-0.2 \times 10^{-5}$.

Injection molding was performed so as to manufacture a polarization beam splitter. The pencil hardness was 3H, the result of polarized light leakage testing was excellent, and the result of adhesion testing was 2. The variation of YI was 2 or less.

Example 3

A pellet-like acrylic thermoplastic resin was obtained similarly as the polymerization of Example 1, except that used were 5.5 kg of benzyl methacrylate (Wako Pure Chemical Industries, Ltd., special grade; hereinafter referred to as "BzMA"), 330 kg of MMA, 44 kg of PMI, 61 kg of CMI, 450 kg of methaxylene, and 400 mass ppm of n-octyl mercaptane per 100 parts by mass of a total amount of monomers. Formulation of this acrylic thermoplastic resin was certified, and structural units derived from each monomer of MMA, PMI, CMI and BzMA were respectively 80 mass %, 8 mass %, 11 mass % and 1.0 mass %. The content of the specific components was 0.23 mass %. Moreover, the glass-transition temperature was measured as 134° C., and the weight-average molecular weight was 140,000. The absolute value $|C_R|$ of the photoelastic coefficient was $0.7 \times 10^{-12}$ Pa$^{-7}$ (the photoelastic coefficient was $+0.7 \times 10^{-12}$ Pa$^{-1}$).

In terms of 3 mm thickness, Re was 2 nm, and Rth was 2 nm. The slope K was $-0.02 \times 10^{-5}$.

Injection molding was performed so as to manufacture a polarization beam splitter. The pencil hardness was 2H, the result of polarized light leakage testing was excellent, and the result of adhesion testing was 1. The variation of YI was 2 or less.

Comparative Example 1

The absolute value $|C_R|$ of the photoelastic coefficient obtained by measuring Zeonor 480R (produced by Zeon Corporation) was $5.0 \times 10^{-12}$ Pa$^{-1}$ (the photoelastic coefficient was $+5.0 \times 10^{-12}$ Pa$^{-1}$). Moreover, the glass-transition temperature was 130° C. In terms of 3 mm thickness, Re was 50 nm, and Rth was 55 nm. The slope K was $0.6 \times 10^{-5}$.

Injection molding was performed so as to manufacture a polarization beam splitter. The pencil hardness was HB, the result of polarized light leakage testing was poor, and the result of adhesion testing was 3. The variation of YI was more than 5.

Comparative Example 2

Polymerization and collection of the polymer was performed similarly as the method of Example 1, except that MMA was used alone as the monomer solution, and 750 mass ppm of n-octyl mercaptane per 100 parts by mass of a total amount of all monomers. The content of the specific components was 0.13 mass %. The absolute value $|C_R|$ of the photoelastic coefficient was $4.7 \times 10^{-12}$ Pa$^{-1}$ (the photoelastic coefficient was $-4.7 \times 10^{-12}$ Pa$^{-1}$). Moreover, the weight-average molecular weight was 100,000. Moreover, the glass-transition temperature was 119° C. In terms of 3 mm thickness, Re was 10 nm, and Rth was 9 nm. The slope K was $-0.33 \times 10^{-5}$.

Injection molding was performed so as to manufacture a polarization beam splitter. The pencil hardness was H, the result of polarized light leakage testing was fair, and the result of adhesion testing was 5. The variation of YI was 2 or less.

Example 4

A reactor (volume: 0.5 L) produced by SUS including a mixing device, a temperature sensor, a condenser, a nitrogen gas introducing nozzle, a raw material solution introducing nozzle, an initiator solution introducing nozzle, and a polymerization solution discharge nozzle was used as a polymerization reactor. The polymerization reactor was controlled so as to have a slightly raised pressure, and the oil path was controlled so as to have a reaction temperature of 130° C.

A raw material solution was prepared by mixing 580 g of methyl methacrylate (MMA), 60 g of N-phenyl maleimide (PMI), 80 g of N-cyclohexyl maleimide (CMI), and 480 g methyl isobutyl ketone, and substituting with nitrogen gas. A polymerization initiator solution was prepared by dissolving 8.6 g of Perhexa C (produced by NOF Corporation; concentration: 75 mass %) in 91.4 g of methyl isobutyl ketone, and then substituting with nitrogen gas.

The raw material solution was introduced at 8.25 ml/min from the raw material introducing nozzle by using a pump. Moreover, the polymerization initiator solution was introduced at 0.08 ml/min from the initiator introducing nozzle by using a pump. After 30 minutes, connection to the polymerization solution discharge nozzle was pulled out, and the polymer solution was discharged at a constant flow of 500 ml/hr.

The polymer solution obtained during 1.5 hours after the discharge was separately collected in an initial discharge tank. The polymer solution obtained during 1.5 to 2.5 hours after the start of the discharge was mainly collected. The obtained polymer solution and methanol as an extraction solvent were supplied to a homogenizer at the same time to be subjected to emulsion dispersion and extraction. The separated and precipitated polymer was collected, and the collected polymer was dried under vacuum for 2 hours at 130° C. to obtain the desired acrylic thermoplastic resin.

Formulation of the obtained acrylic thermoplastic resin was certified, and structural units derived from each monomer of MMA, PMI and CMI were respectively 82 mass %, 8 mass and 10 mass %. The weight-average molecular weight (Mw) was 225,000, and the molecular weight distribution (Mw/Mn) was 2.14. The glass-transition temperature (Tg) was 134° C., and the absolute value $|C_R|$ of the photoelastic coefficient was $0.4 \times 10^{-12}$ Pa$^{-1}$ (the photoelastic coefficient was $+0.4 \times 10^{-12}$ Pa$^{-1}$). The other characteristic values are as indicated in Table 1.

Properties and evaluation on Examples 1, 2, 3, 4, and Comparative Examples 1, 2 are summarized in the following Table 1.

TABLE 1

| | | | Example 1 | Example 2 | Example 3 | Example 4 | Comparative Example 1 | Comparative Example 2 |
|---|---|---|---|---|---|---|---|---|
| Resin formulation | MMA | Mass % | 81 | 70 | 80 | 82 | Zeonor 480R | 100 |
| | PMI | Mass % | 8 | 5 | 8 | 8 | | — |
| | CMI | Mass % | 11 | 20 | 11 | 10 | | — |
| | St | Mass % | — | 5 | — | — | | — |
| | BzMA | Mass % | — | — | 1 | — | | — |
| | PMI/CMI (molar ratio) | | 0.75 | 0.26 | 0.75 | 0.75 | — | — |
| Properties | Weight average molecular weight (Mw) | $\times 10^4$ | 18 | 14 | 14 | 22.5 | — | 10 |
| | Total content of specific components | Mass % | 0.26 | 0.21 | 0.23 | 0.42 | 0.19 | 0.13 |
| | Glass transition temperature | ° C. | 135 | 141 | 134 | 134 | 130 | 119 |
| | In-plane phase difference (Re) | nm | 9.0 | 24.0 | 2.0 | 10.0 | 50.0 | 10.0 |
| | Thickness directional phase difference (Rth) | nm | 26.0 | 16.0 | 2.0 | 28.0 | 55.0 | 9.0 |
| | Photoelastic coefficient | $\times 10^{-12}$ Pa$^{-1}$ | +0.4 | +0.1 | +0.7 | +0.4 | +5.0 | −4.7 |
| | Absolute value of photoelastic coefficient | $\times 10^{-12}$ Pa$^{-1}$ | 0.4 | 0.1 | 0.7 | 0.4 | 5.0 | 4.7 |
| | Slope K | $\times 10^{-5}$ | +0.03 | −0.2 | −0.02 | +0.03 | +0.6 | −0.33 |
| Evaluation | Surface Hardness | — | 4H | 3H | 2H | 4H | HB | H |
| | YI change amount (ΔYI) at 85° C./85% RH/before and after 500H | — | ≤2 | ≤2 | ≤2 | 3.8 | >5 | ≤2 |
| | Polarized light leakage testing | — | Excellent | Excellent | Excellent | Excellent | Poor | Fair |
| | Adhesion measurement of inorganic layer (multilayer transparent dielectric layer) | — | 2 | 1 | 1 | 3 | 3 | 5 |
| | Display quality | — | Excellent | Good | Good | Good | Poor | Poor |

It is understood that Examples 1, 2, 3, 4 have better optical properties (low birefringence) as compared to Comparative Examples 1, 2. In particular, it is understood that a ternary formulation of MMA, PMI and CMI for the polarization light transmitting optical component. Moreover, it is understood that Examples 1, 2, 3, 4 have better adhesion of the inorganic layer (the multilayer transparent dielectric layer) as compared to Comparative Examples 1, 2. Moreover, it is understood that Examples 1, 2, 3, 4 have higher hardness and are unlikely to be damaged as compared to Comparative Examples 1, 2.

INDUSTRIAL APPLICABILITY

The optical component for HMD of this disclosure is suitably used as a resin component for HMD having high optical isotropy (low birefringence) necessary as a component for HMD, and having excellent heat resistance, color tone, surface hardness, durability in environment of use, and inorganic adhesion. Specifically, the optical component for HMD of this disclosure is suitably used to a lens, a molded product, a laminate, a half mirror, a polarization beam splitter, etc.

REFERENCE SIGNS LIST

1: optical projection device
10: light source
12: spherical mirror
14: collimator lens
16: infrared ray removal filter
18: quarter wave plate
20: polarization beam splitter (PBS)
20a: multilayer transparent dielectric film
22: mirror

The invention claimed is:

1. A component for head mounted display comprising a methacrylic resin composition having a glass-transition temperature (Tg) of 120° C. or higher, having an in-plane phase difference in absolute value of 30 nm or less in terms of 3 mm thickness, wherein
the methacrylic resin composition comprises a methacrylic resin which includes 50 mass % to 97 mass % of a methacrylic acid ester monomer unit (A), 3 mass % to 30 mass % of a structural unit (B) having a cyclic structure-containing main chain, and 0 mass % to 20 mass % of another vinyl monomer unit (C) that is copolymerizable with a methacrylic acid ester monomer, and satisfying the following conditions (1) and (2);
(1) weight average molecular weight as measured by gel permeation chromatography (GPC) is 65,000 to 300,000, and
(2) when subjected to GC/MS measurement using a specific device and specific conditions described further below, components detected at a retention time of 22 minutes to 32 minutes have a total content of 0.01 mass % to 0.40 mass % when the methacrylic resin is taken to be 100 mass %.

2. The component for head mounted display according to claim 1, wherein:
the methacrylic resin composition has a photoelastic coefficient in absolute value of $3.0 \times 10^{-12}$ $Pa^{-1}$ or less.

3. The component for head mounted display according to claim 2, wherein:
after holding for 500 hours under an atmosphere at 85° C., humidity 85%, variation of a color tone YI is less than 5 in terms of 3 mm thickness.

4. The component for head mounted display according to claim 2, wherein:
the methacrylic resin composition further comprises a thermal stabilizer, and
the content of the thermal stabilizer per 100 parts by mass of the methacrylic resin is 0.01 parts by mass to 5 parts by mass.

5. The component for head mounted display according to claim 2, wherein: the structural unit (B) having a cyclic structure-containing main chain is a maleimide-based structural unit (B-1).

6. The component for head mounted display according to claim 1, wherein:
after holding for 500 hours under an atmosphere at 85° C., humidity 85%, variation of a color tone YI is less than 5 in terms of 3 mm thickness.

7. An optical lens comprising the component for head mounted display according to claim 1.

8. A molded product comprising the component for head mounted display according to claim 1.

9. A laminate comprising at least one metal deposited layer on a surface of the molded product according to claim 8.

10. A half mirror comprising the laminate according to claim 9.

11. A polarization beam splitter comprising the laminate according to claim 9.

12. The component for head mounted display according to claim 1, wherein:
the methacrylic resin composition further comprises a thermal stabilizer, and
the content of the thermal stabilizer per 100 parts by mass of the methacrylic resin is 0.01 parts by mass to 5 parts by mass.

13. The component for head mounted display according to claim 1, wherein: the structural unit (B) having a cyclic structure-containing main chain is a maleimide-based structural unit (B-1).

* * * * *